United States Patent [19]

Togashi et al.

[11] Patent Number: 4,703,628
[45] Date of Patent: Nov. 3, 1987

[54] APPARATUS FOR PREPARING FROZEN PRODUCTS

[75] Inventors: Shigeru Togashi, Ashikaga; Hiromi Saitoh, Ohizumi; Shigeyuki Takahashi, Ohta; Yasuo Makino, Ohra; Mitsuru Kakinuma, Sakai; Shigeo Satoh, Chiyoda; Shigeki Sugiyama, Ohta, all of Japan

[73] Assignee: Sanyo Electric Co., Japan

[21] Appl. No.: 763,405

[22] Filed: Aug. 7, 1985

[30] Foreign Application Priority Data

Aug. 10, 1984 [JP] Japan ................... 59-168001
May 14, 1985 [JP] Japan ................... 60-102076

[51] Int. Cl.⁴ .......................... F25C 1/00; A23G 9/00
[52] U.S. Cl. ............................ 62/135; 62/348; 62/303; 62/342; 222/55
[58] Field of Search ............... 62/135, 303, 136, 137, 62/138, 139, 197, 342, 348, 390, 394, 395, 399; 222/56, 58, 55, 59, 60, 641, 640

[56] References Cited

U.S. PATENT DOCUMENTS

| | | | |
|---|---|---|---|
| 2,746,260 | 5/1956 | Swenson | 222/640 X |
| 2,961,853 | 11/1960 | Cohrt | 62/303 X |
| 3,335,807 | 8/1967 | Tytas | 222/55 X |
| 3,811,494 | 5/1974 | Menzel | 62/348 X |
| 3,898,859 | 8/1975 | Duke | 62/135 |
| 3,930,535 | 1/1976 | Menzel | 62/342 X |
| 3,961,494 | 6/1976 | Schaefer et al. | 62/138 X |
| 3,995,770 | 12/1976 | Schwitters | 222/56 |
| 4,332,145 | 6/1982 | Yuhasz et al. | 62/342 |
| 4,476,146 | 10/1984 | Manfroni | 62/342 |

Primary Examiner—Harry Tanner
Attorney, Agent, or Firm—Darby & Darby

[57] ABSTRACT

An apparatus for preparing frozen products having a mix tank, a freezing chamber, a liquid mix supply means, a dispensing device, a freezing means for the freezing chamber comprising independent first and second freezing systems, and a frozen control means comprising a first and second frozen control means for said first and second freezing systems respectively, and making it possible that liquid mix in the freezing chamber may be always frozen in good condition. Further an apparatus for preparing frozen products having a frozen and chilled control means for the freezing means independently, and making it possible that liquid mix is stored in the freezing chamber when the freezing operation does not occur.

25 Claims, 20 Drawing Figures

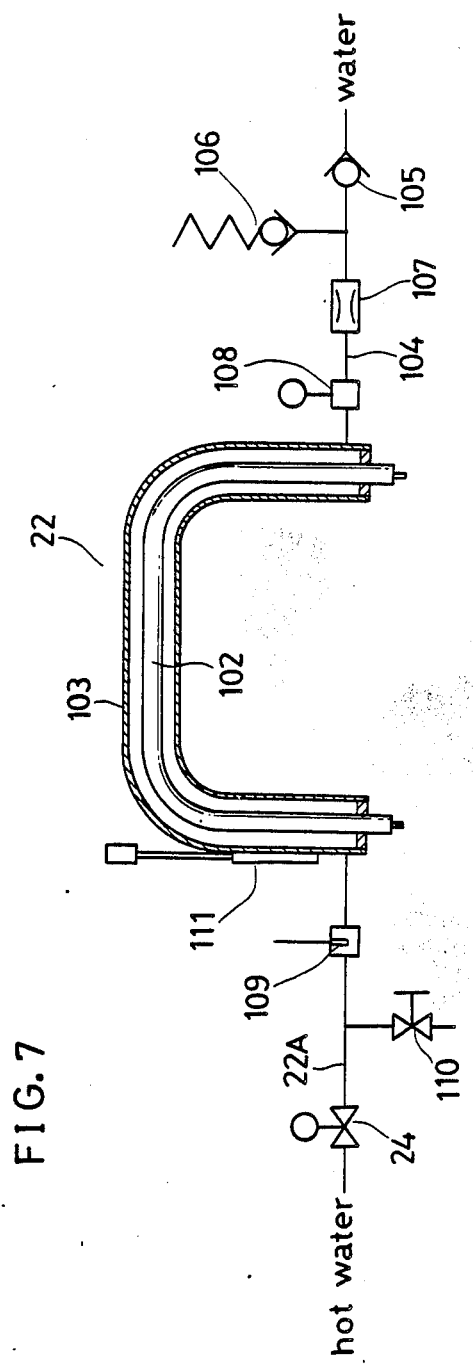
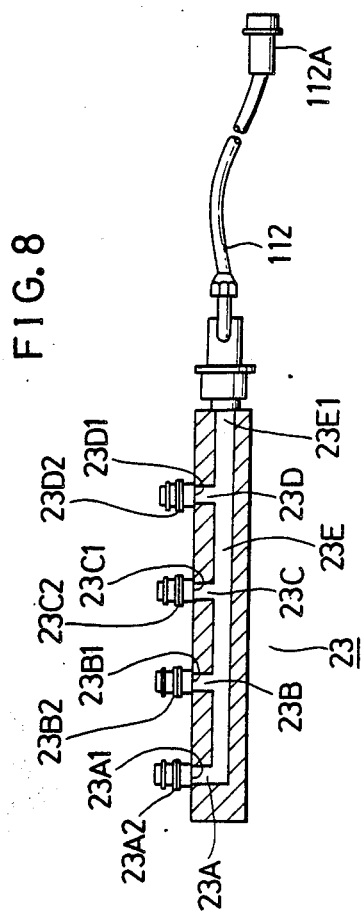
FIG.7
FIG.8

APPARATUS FOR PREPARING FROZEN PRODUCTS

BACKGROUND OF THE INVENTION

1. Field of the Invention

This invention relates to an apparatus for preparing frozen products such as ice-cream, soft ice cream and the like.

2. Description of the Prior Art

In general, one of the matters to be given the most consideration in designing an apparatus for preparing frozen products is the operational control of a freezing system used to bring about freezing temperature in a freezing chamber of the apparatus. This is important to finish liquid mix supplied to the freezing chamber to an ice-cream base having a proper hardness (viscosity).

As an example of an operational control device of a temperature detecting system which has been used widely, a control device is disclosed in the Japanese Utility Model Early Publication No. Sho 53(1978)-121199. In this control device, in view of the general composition of the refrigerating chamber (freezing chamber) where a taking out port is provided in the front and a material input is provided in the rear, the front thermostat which controls a compressor motor of a refrigerating system by detecting the temperature near the outlet of the refrigerating chamber and the rear thermostat which controls a compressor motor by detecting the temperature near the material inlet of the refrigerating chamber are provided in series and it is designed that the compressor motor is stopped by the front thermostat and that it is re-started by the rear thermostat.

It is mentioned that such a conventional device is effective for continuous sale because freezing operation can be re-started in quick response to the replenishment of materials. However, because of the above-mentioned quick response, the device is inherently disadvantageous in that ice cream near the taking out port in the front of the refrigerating chamber is frozen too much when sales are made intermittently.

In the conventional ice cream manufacturing machine, a product remaining in the freezing chamber is collected and stored in a refrigerator at the end of the sale day and the collected product is used again on the following sale day. On the other hand, as the used machine is not operated until the following day, the freezing chamber must be cleaned and sterilized under governmental sanitary laws.

For example, disclosed in the Japanese Patent Publication No. Sho 56(1981)-9093 is a soft cream manufacturing machine which requires collection of soft cream remaining in the refrigeration cylinder (freezing chamber) after the sale day is over and then cleaning of the refrigerating cylinder.

Such a machine is disadvantageous in that it required troublesome collecting and cleaning after sales every day, requiring a gret deal of labor.

BRIEF SUMMARY OF THE INVENTION

This invention relates to an apparatus for preparing frozen products comprising (a) a mix tank to store liquid mix, (b) a freezing chamber having an inlet of liquid mix and providing an agitator to agitate liquid mix, (c) a liquid mix supply means to supply liquid mix in the mix tank to the freezing chamber through the inlet, (d) a dispensing device for dispensing frozen products in the freezing chamber, (e) a freezing means to effect a freezing temperature in an area of the freezing chamber including the neighborhood of the dispensing device, and a second freezing system to effect a freezing temperature in an area of the freezing chamber including the neighborhood of the inlet of liquid mix, and the frozen control means comprises a first frozen control means to control operation of the first freezing system independently and a second frozen control means to control operation of the second freezing system independently.

With this invention, liquid mix in the freezing chamber may always be frozen in good condition, and high quality soft cream and shakes may be supplied.

The freezing chamber in this invention has the capability of freezing and agitating the liquid mix supplied from the mix tank and producing frozen products such as soft ice cream and ice-cream shakes. The freezing chamber is cylindrical and is arranged so that its axis is aligned with the front to rear direction of the whole apparatus. The inlet of liquid mix is provided at the rear and the dispensing device is located in the front.

In this invention, the first and second freezing systems have the function of freezing the freezing chamber independently. Both freezing systems include evaporative pipes which are wound around the freezing chamber and a mechanism for feeding a freezing media to these evaporative pipes.

The first and second frozen control means maintain the freezing chamber at a preset temperature. For example, when a temperature at a preselected position in the freezing chamber exceeds more than the preset temperature, the corresponding freezing system is actuated. A preset temperature of the second frozen control means is set higher than that of the first frozen control means.

The dispensing device is to dispense the above-mentioned frozen products frozen and agitated in the freezing chamber to the outside.

The liquid mix supply means is to supply liquid mix in the mix tank to the freezing chamber and is composed of a mix supply pipe and a supply working body such as pumping equipment. In the situation where the mix tank is provided over the freezing chamber and liquid mix is supplied by the use of gravity, the layout composition itself of the mix tank and the mix supply pipe becomes the mix supply means.

Furthermore, the apparatus of this invention may provide further at least one mechanism of (a) a cleaning mechanism comprising a cleaning means of a dispensing device and a cleaning control means to control operation of the cleaning means, (b) a sterilizing mechanism comprising a sterilizing means of a freezing chamber and a sterilization control means of a freezing chamber and a sterilizing means, and (c) a dispensing amount controlling mechanism comprising a dispensing amount detecting means to detect the amount of frozen products dispensed by the dispensing device and a dispensing amount control means to control the stop of dispensation of frozen products basing upon a signal from the dispensing amount detecting means. With such composition, a clean and convenient apparatus for preparing frozen products is obtained.

For the cleaning mechanism, the sterilizing mechanism and the extracting amount controlling mechanism, any one or two of them may be used for this apparatus, or all of them may be used.

The cleaning means cleans the inside of the dispensing device with hot water when dispensation is not made, and is composed of a hot water supply device and a hot water supply pipe which goes to the dispensing device from the hot water supply device.

The sterilizing means sterilizes liquid mix in the freezing chamber when freezing is not made and generally it is made through heating. Heating is effected with an electric heater facing the freezing chamber and a heating media pipe.

The dispensing amount detecting means is to detect the amount of frozen products dispensed to the outside from the dispensing device. It may be a weight detecting means to detect the weight of dispensed products or a means to detect dispensing time. In accordance with a signal from the dispensing amount detecting means, the dispensing amount control means closes a mix supply valve.

Furthermore, the apparatus may be further provided with a frozen control means to control operation of the freezing means to keep liquid mix in the freezing chamber in the semi-frozen condition, a chilled control means to control operation of the freezing means to keep liquid mix in the freezing chamber in the low-temperature liquid condition. With this chilled control means, the necessity for taking out liquid mix in the freezing chamber and storing separately when freezing operation is not effected, for example, in the nighttime, is omitted.

The chilled control means controls the operation of a freezing means so that liquid mix in the freezing chamber is stored when the freezing operation is not effected, for example, at night. The chilled control means is to control operation so that the freezing means keeps liquid mix at a higher temperature than temperature at the time of freezing. The preset chilling temperature is a little higher than 0° C. The freezing means which is controlled by the chilled control means may be either the first or second freezing system or both of them.

The switching means switches the operation of the freezing means at the time of start and finish of the business hour for example to the freezing operation and the chilling operation. For example, it may be a switch mechanism.

In the apparatus having a cleaning mechanism and a sterilizing mechanism, acceptable composition is such that each mechanism is activated properly according to the switching movement of a switching means. For example, it is preferable if cleaning is made prior to freezing and if sterilization is made prior to chilling.

Furthermore, this invention may provide several kinds of syrup tanks and syrup supply means to supply syrup in these syrup tanks to a dispensing device. The dispensing device also serves as a mixing chamber of liquid mix and syrup.

If mix supply means and syrup supply means can be combined and used by a supply means such as a compressed gas supply source, for example, the structure of the apparatus is simplified.

BRIEF DESCRIPTION OF THE DRAWING

FIG. 7 is a concrete illustration view to show the composition of the hot water supply device.

FIG. 8 is a sectional view of the connector used at the time of cleaning of the dispensing device.

DESCRIPTION OF THE PREFERRED EMBODIMENT

Figure 1:
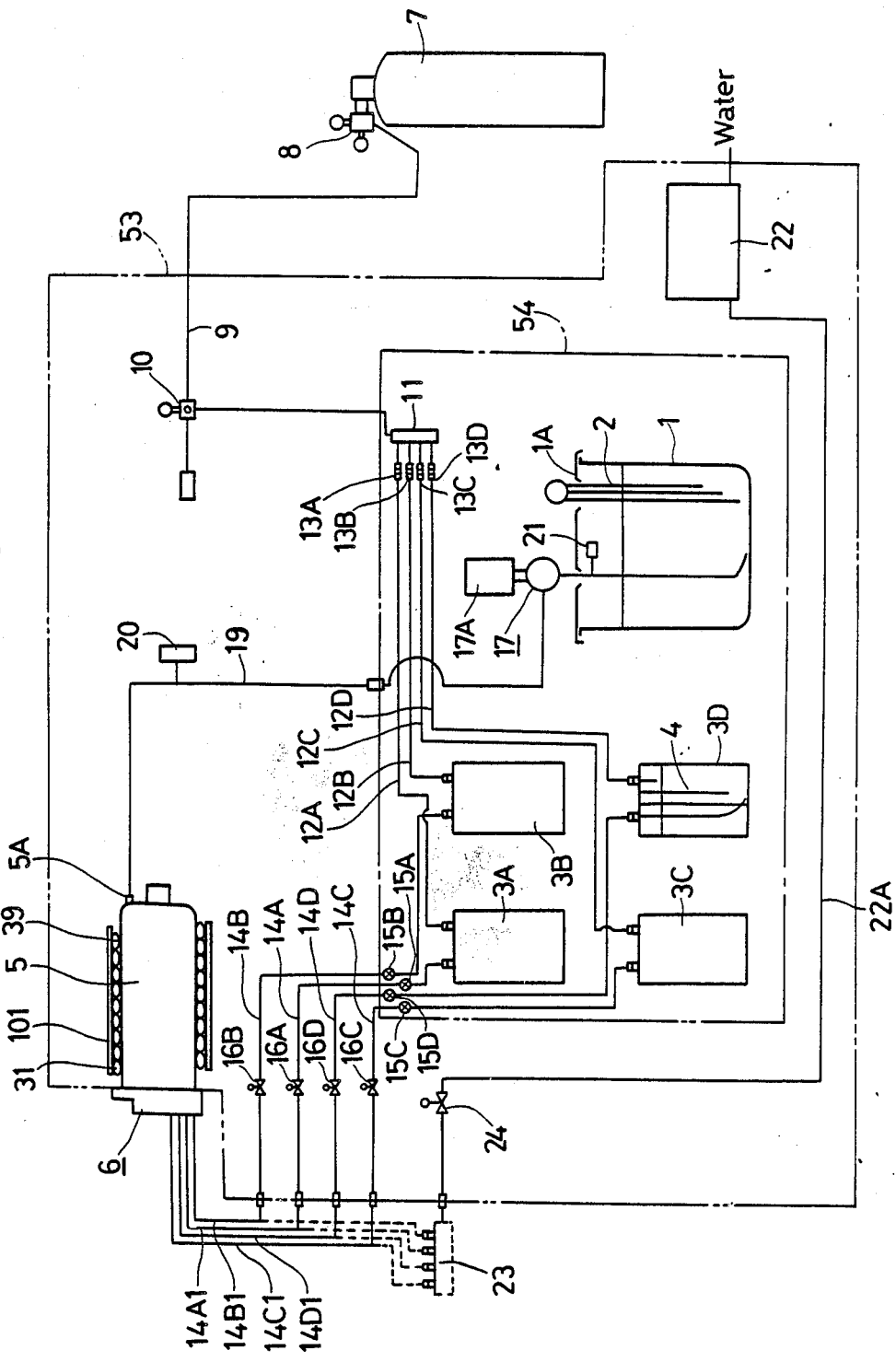
FIG. 1 is a system diagram showing mainly feeding of material and hot water used in an ice-cream shake preparing machine in which this invention is put to practical use.

An embodiment of this invention will now be described by way of an ice-cream shake preparing machine and with reference to the accompanying drawings. FIG. 1 shows mainly a system diagram of material supply, wherein 1 is a mix tank to store liquid ice-cream mix. The top of the mix tank is covered with a detachable lid 1A to replenishliquid mix. 2 is an electrode type shortage of liquid mix detecting device to detect the amount of liquid mix in the mix tank 1. 3A, 3B, 3C and 3D are syrup tanks to store different liquid syrup such as chocolate, strawberry, vanilla and yogurt. As illustrated in the syrup tank 3A, all the syrup tanks are equipped with an electrode type shortage of syrup detecting device 4. 5 is a freezing chamber having a detachable semi-frozen products dispensing device 6 in front and a liquid mix inlet 5A at the rear. 7 is a compressed gas cylinder to contain compressed gas such as carbonic acid gas and nitrogen gas.

The gas cylinder 7 has a primary pressure regulator 8 at its outlet. A pneumatic pipe 9 starting from the outlet of the regulator 8 is connected to a branch joint 11 through a secondary pressure regulator 10. One end of four syrup pressure pipes 12A, 12B, 12C and 12D is connected to four outlets of the branch joint 11 and the other ends of their pipes are connected to the syrup tanks 3A, 3B, 3C and 3D through check valves 13A, 13B, 13C and 13D. Sirup supply pipes 14A, 14B, 14C and 14D extending from the sirup tanks 3A, 3B, 3C and 3D are connected to the dispensing device 6. Needle valves 15A, 15B, 15C and 15D for controlling the flow rate of syrup are provided at the upstream side of the syrup supply pipes and syrup supply solenoid valves 16A, 16B, 16C and 16D are provided at the downstream side of the same pipes.

A mix suction pipe 18 is connected to the suction side of a pumping equipment 17 for feeding liquid mix in the mix tank 1 to the freezing chamber 5 and the other end of same pipe is open near the bottom of the mix tank 1. A mix supply pipe 19 is connected to the dischange side of same pumping equipment and the other end of same pipe 19 is connected to the liquid mix inlet 5A at the rear of the freezing chamber 5. A driving motor 17A for the pumping equipment 17 is connected to the mix supply pipe 19 and controlled by a pressure detecting device 20 which detects the amount of liquid mix in the freezing chamber 5 indirectly by means of pressure. An air intaking pipe 21 which branches from the mix suction pipe 18 and is open to the air is important in order to let air into liquid mix to realize appropriate overrunning. 22 is a hot water supply device to clean and sterilize the inside of the dispensing device 6. A hot water supply pipe 22A can be connected to the dispensing device 6 by the use of a connector 23 and usually the flow of hot water is shut off by a hot water supply solenoid valve 24.

Figure 2:
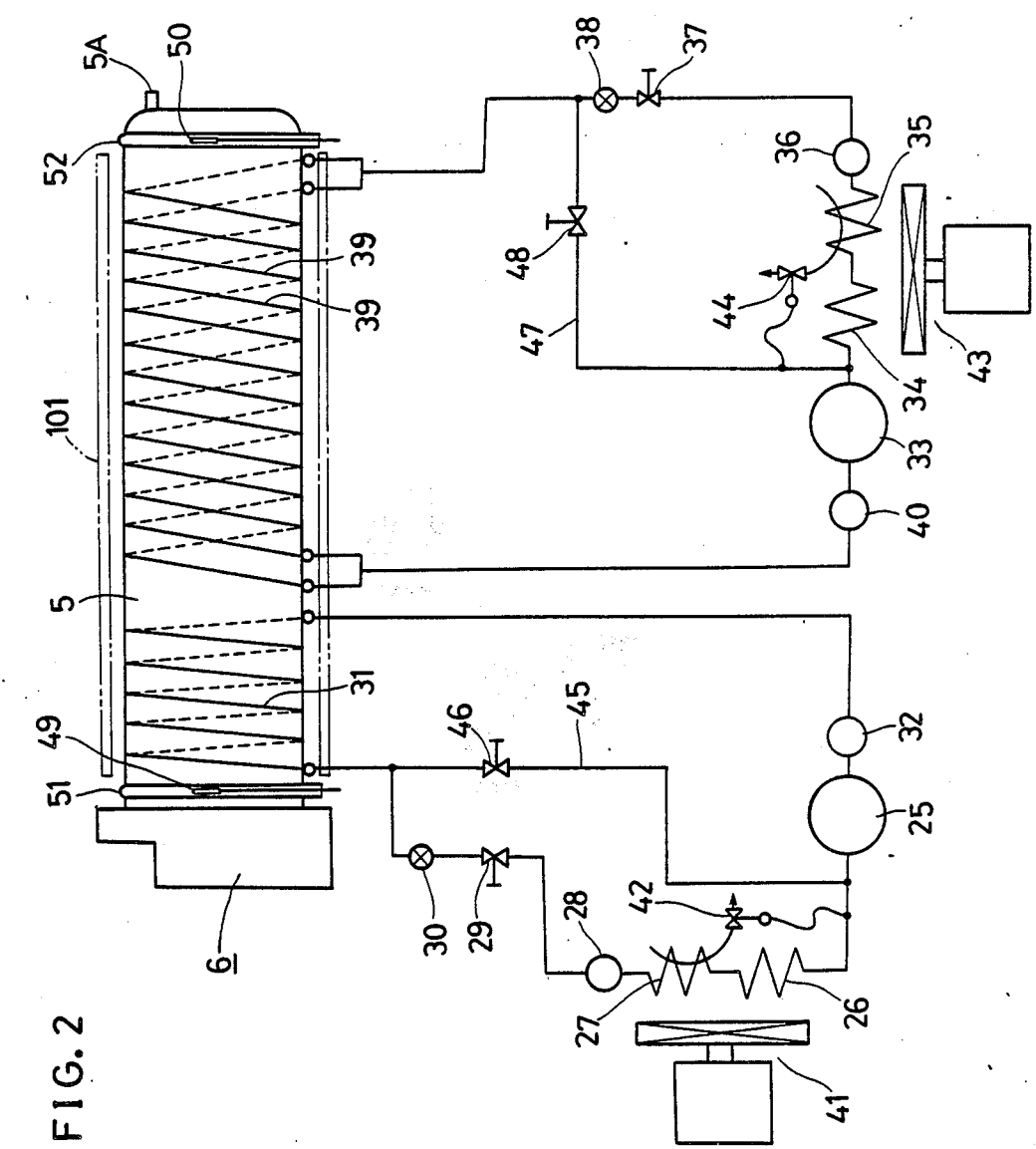
FIG. 2 is a system diagram of the freezing system to freeze liquid mix in the freezing chamber.

Next, referring to FIG. 2, systematized freezing means including those of freezing the above-mentioned freezing chamber 5 will be explained. The freezing means of the embodiment is composed of a front freezing system which is the first freezing system where a front compressor 25, a front air-cooled condenser 26, a front water-cooled double pipe condenser 27 where water passes in the inner pipe and freezing media pass in the outer pipe though not shown in detail in the drawing, a front receiver tank 28, a front freezing solenoid valve 29, a front expansion valve 30, a front evaporating pipe 31 and a front accumulator 32 are connected in a ring shape and a rear freezing system which is the second freezing system where a rear compressor 33, a rear air-cooled condenser 34, a rear water-cooled condenser 35 having the same composition as the aforementioned front water-cooled condenser 27, a rear receiver tank 36, a rear freezing solenoid valve 37, a rear expansion valve 38 adopted as a pressure reducing device, a rear evaporative pipe 39 and a rear accumulator 40 are connected in a ring shape.

Thus the front evaporative pipe 31 of the front freezing system is wound round the front periphery of the freezing chamber 5 and the rear evaporative pipe 39 of the rear freezing system is wound round the rear periphery of the freezing chamber 5. With this arrangement, the evaporative pipes are wound round nearly the overall width of the freezing chamber 5 and the front part of the freezing chamber 5 is freezed independently with the front freezing system and the rear part of the freezing chamber 5 is freezed independently with the rear freezing system. In the embodiment, though the winding area of the rear evaporative pipe 39 is set about double that of the front evaporative pipe 31, this ratio must be decided in consideration of the capacity of the front compressor 25 and the rear compressor 33 and it is not always limited to the ratio shown in the embodiment. Bisides that, the rear evaporative piep 39 is not limited to branch composition but can be winding composition with one pipe. Furthermore, the method is not limited to pipe winding. A method consisting of the front and rear evaporating areas will do.

As devices composed in relation to the front freezing system, a front blower 41 to cool the front air-cooled condenser 26 and the front water-cooled condenser 27 and a front water saving valve 42 which responds to condensing pressure and opens when condesing pressure reaches a fixed high pressure are provided. Likewise the rear freezing system is equipped with a rear blower to cool the rear air-cooled condenser 34 and the rear water-cooled condenser 35 and a rear water saving valve 44. Furthermore, in the front freezing system a front bypass pipe 45 whose one end is connected between the front compressor 25 and the front air-cooled condenser 26 and whose other end is connected between the front expansion valve 30 and the inlet side of the front evaporative pipe 31 and a front hot gas solenoid valve 46 connected to said bypass pipe 45 are provided. In the rear freezing system a rear bypass pipe 47 whose one end is connected between the rear compressor 33 and the rear air-cooled condenser 34 and whose other end is connected between the rear expansion valve 38 and the outlet side of the rear evaporative pipe 39 and a rear hot gas solenoid valve 48 connected to said bypass pipe 47 are provided. The composition of these bypass pipes 45 and 47 and the solenoid valves 46 and 48 is used effectively at the time of sterilization mentioned later.

In the front freezing system, freezing operation is controlled independently based on temperature-sensitive motion of a front temperature detecting element 49 using a thermistor for example, and in the rear freezing system, freezing operation is controlled independently based on temperature-sensitive motion of a rear temperature detecting element 50 using a thermistor for example. The front thermistor 49 is situated in a copper pipe 51 fitted to the forward end outer surface of the freezing chamber 5 and the rear thermistor 50 is situated in a copper pipe 52 fitted to the backward end outer surface of the freezing chamber 5. The embodiment adopts an indirect temperature detecting system to perceive temperature of liquid mix in the freezing chamber 5 by fitting the front thermistor 49 and the rear thermistor 50 to the outer surface of the freezing chamber 5 as mentioned above. However, it is possible to adopt a direct temperature detecting system to put these thermistors at the forward and backward ends in the freezing chamber 5.

Figure 3:
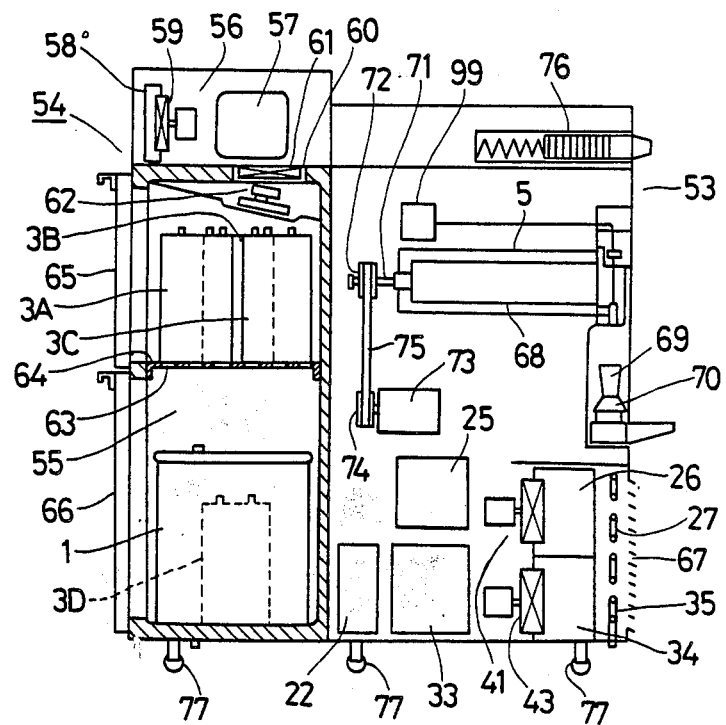
FIG. 3 is a schematic illustration view to show the inside layout of the devices of an ice-cream shake preparing machine.

Most devices explained above are housed in a main body 53 and a refrigerator 54 provided at the rear of the main body 53 as a rough arrangement plan is shown in FIG. 3. The refrigerator 54 consists of a refrigerating chamber 55 of adiabatic structure and a machine room 56 provided over the refrigerting chamber 55. a compressor 57, a condenser 58 and a blower 59 for cooling said condenser 58 are provided in the machine room 56 and they constitutes a freezing device together with an evaporator 61 provided at an opening 60 formed in a ceiling wall 55A of the refrigerating chamber 55. Chill generated by operation of the freezing device is sent to the refrigerating chamber 55 by a blower 62 provided under the evaporator 61. The refrigerating chamber 55 is divided into the upper and lower chambers by a partition board 64 in which lots of air vents 63 are formed. The aforementioned mix tank 1 and the syrup tanks 3A, 3B, 3C and 3D are stored in these chambers through doors 65 and 66.

On the other hand, installed at the lower part of the main body 53 are the compressors 25 and 33, air-cooled condensers 26 and 34, water-cooled condensers 27 and 35, blowers 41 and 43 of the above-mentioned front and rear freezing systems and the hot water supply system 22. In the front facing the air-cooled condensers 26 and 34, an inlet port 67 is formed, and on the side of the main body 53 a blow-off port is formed though not shown in the drawing. The aforementioned freezing chamber 5 housing an agitator 68 is provided at the upper part of the main body 53. A supporter 70 with a cup 69 put on it is composed under the aforementioned dispensing device 6 fitted to the front of the freezing chamber 5. Rotation of a driving motor 73 is transmitted to the agitator 68 through an endless belt 75 applied to a driven pulley 72 connected to a rotation shaft 71 extending from said agitator 68 to the outside of the freezing chamber 5 and a driving pulley 74 conncecting to an output shaft of an agitator motor 73. Furthermore, composed at the uppermost part of the main body 53 is a cup dispenser 76 where lots of cups 69 are housed. The compressed gas cylinder 7 is not housed in the main body 53 or the refrigerator 54 but is put separately. The main body 53 and the refrigerator 54 housing various equipment as mentioned above can be moved freely with plural casters 77 fitted to the bottom.

Now with reference to FIGS. 4, 5 and 6, structure of the above-mentioned dispensing device 6 will be described in detail. A cylindrical pit 79 whose both ends are open and a cylindrical cave 80 which extends from the vicinity of the center of said pit 79 toward the freezing chamber 5 and whose end is open and connected to the freezing chamber 5 are formed in a removable resinous cover 78 which closes a front opening of the freezing chamber 5. A bearing plate 82 in which a discharge port 81 is formed at the lower part is fitted to the opening edge on the freezing chamber 5 of this cave 80. The bearing plate 82 slidably supports a movable shaft 84 which extends backward form an umbrella-shaped valve 83. A coiled spring 85 surrounding the movable shaft 84 is provided between the bearing plate 82 and the valve 83 so that said valve 83 blocks the cave 80 by pressing the valve 83 to a step part 86 usually formed at an intermediate part of the cave 80. The valve 83 is mainly made of stainless steel and the part which is pressed to the step part 86 is made of silicon to improve sealing efficiency.

On the other hand, the mechanism to move the valve 83 backward in resisting said coiled spring to open the cave 80 is composed of a slidable working lever 87 whose backward end touches the tip of the valve 83 and forward end passes through the cover 78 and is protruding forward, a lever 89 whose lower part is rotatably connected to the front of the working lever 87 to allow reciprocation of said working lever 87 and has a rotatable fulcrum 88 connected to the cover 78 at an upper position, a solenoid device 91 having a plunger 91A which connects a working pin 90 and crosses at right angles at the upper rear part of said lever 89 and a return spring 92 to return the lever 89 to its normal position. With this composition the valve 83 is automatically opened and closed, following the solenoid device 91. In additionn, the valve 53 can also be opened and closed by mannual operation of the lever 89.

The lower part of the pit 82 is used as a mixing chamber 93 with the lower opening as an outlet 93A. An impeller 94 in which lots of air vents 94A are formed is provided in said mixing chamber 93. The impeller 94 is connected to the lower part of a rotation shaft 96 which passes through a plain bearing 95 detachably fitted to the upper part of the pit 82 and extends upward. On the other hand, the upper end of the rotation shaft 96 is detachable connected to a flexible cable 98 passing through the inside of a protection tube 97 and rotaion is transmitted by connecting the end of this cable 98 to a motor 99 shown in FIG. 3.

Figure 4:
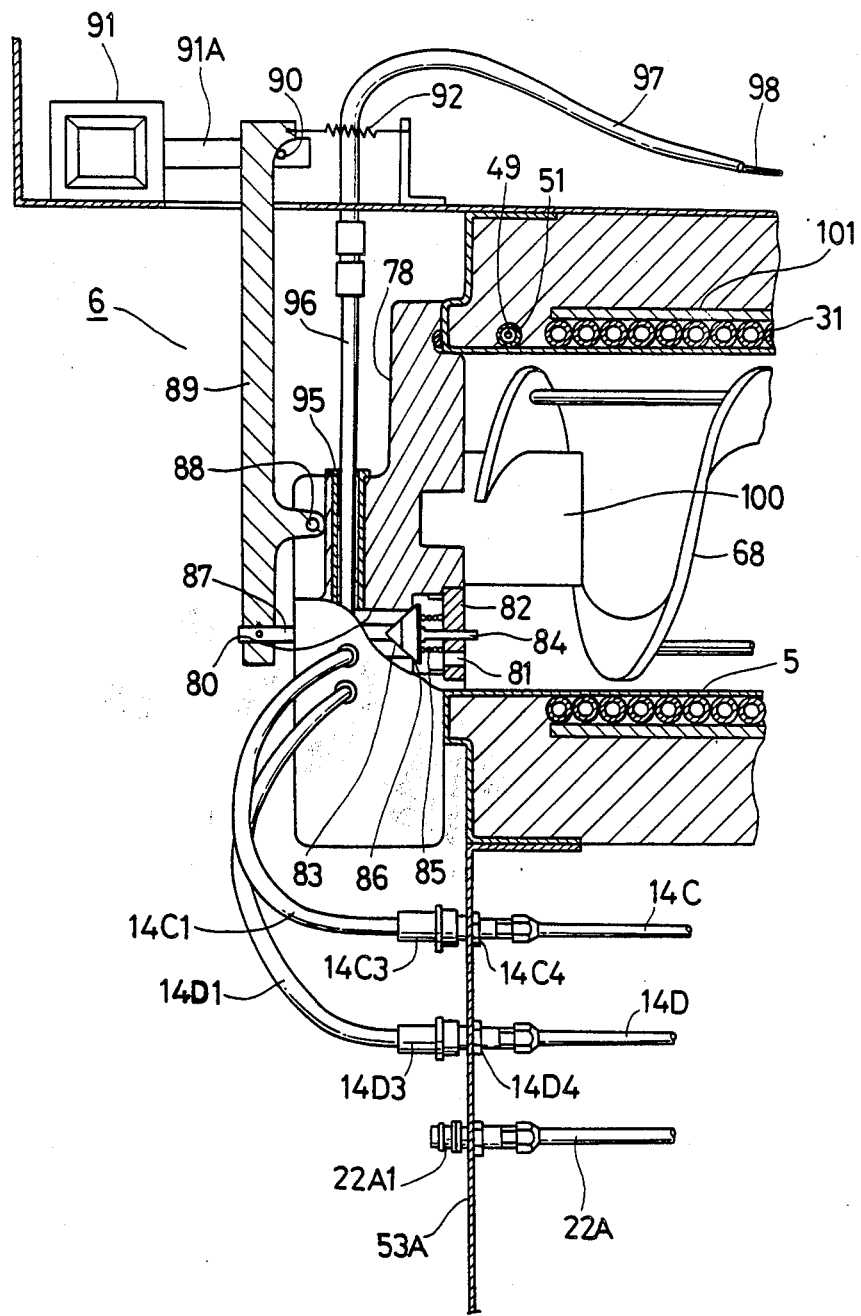
FIG. 4 is a sectional side elevation view of the front part of the freezing chamber and a part of the dispensing device.
Figure 5:
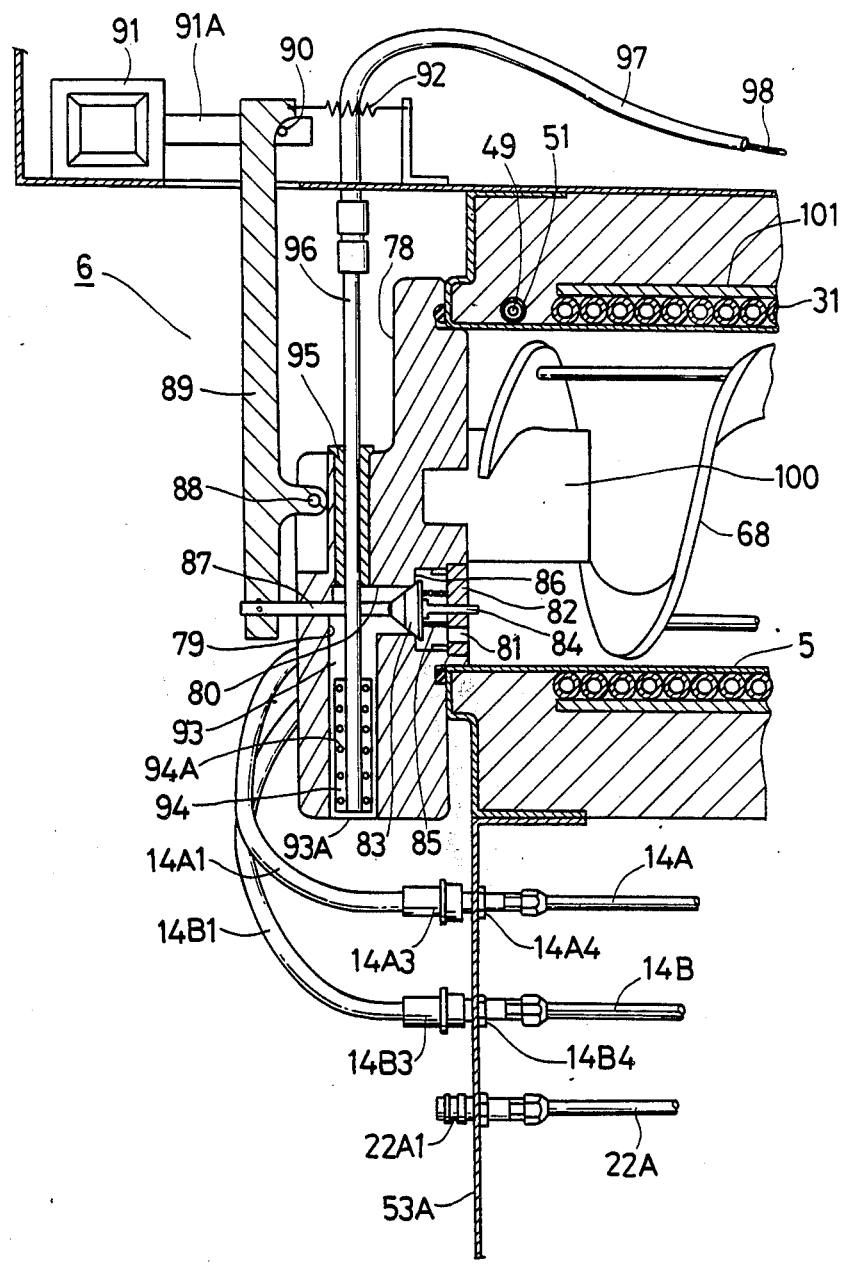
FIG. 5 is a sectional side elevation view of the front part of the freezing chamber and the whole body of the dispensing device.
Figure 6:
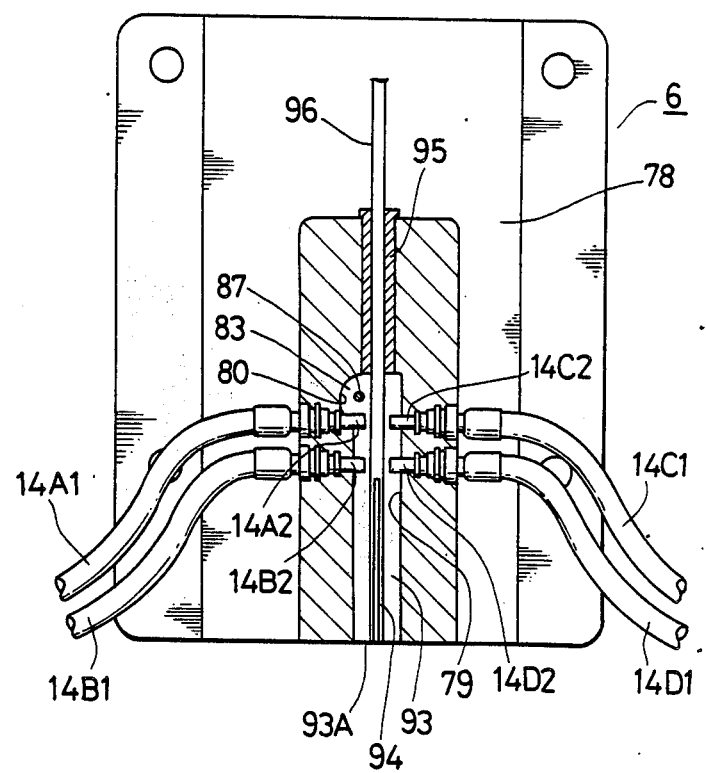
FIG. 6 is an elevational view in section of the dispensing device.

Furthermore, as composition except the dispensing device 6 shown in FIGS. 4, 5 and 6, a cylindrical bearing 100 fitted to the rear of the cover 78 supports the forward end of the agitator 68. As shown also in FIGS. 1 and 2, a surface-shaped electric heater 101 wound round the evaporative pipes 31 and 39 is provided to sterilize the freezing chamber 5 and its contents mentioned later. As mentioned above, the syrup supply pipes 14A, 14B, 14C and 14D connected to the dispensing device 6 passes through internal space of the main body 53 from the refrigerator 54 and the part which is led to the front of the main body 53 is formed by detachable flexible transparent pipes 14A1, 14B1, 14C1 and 14D1. These transparent pipes 14A1 through 14D1 are connected as if they are projected into the inside of the mixing chamber 93 with nozzles 14A2, 14B2, 14C2 and 14D2 provided at the end which are put on the upper part of said chamber 93, and self-sealing couplings 14A3, 14B3, 14C3 and 14D3 are provided at the other end. On the other hand, self-sealing couplings 14A4, 14B4, 14C4 and 14D4 which are fixed to a front plate 53A of the main body 53 are provided at the end of the syrup supply pipes 14A through 14D. By connecting the self-sealing couplings 14A3 through 14D3 on the side of the transparent pipes 14A1 through 14D1 to the self-sealing couplings 14A4 through 14D4 on the side of the syrup supply pipes 14A through 14D, it is possible to establish four syrup passages between the syrup tanks 3A through 3D and the mixing chamber 93.

Next, in reference with FIG. 7, the above-mentioned hot water supply system 22 will be discribed in detail. In the embodiment an instantaneous hot-water heater is adopted. Both ends of a heating pipe 103 housing a sheath heater 102 on the same concentricity is sealed liquid-tightly. A feed water pipe 104 connected to the end on the inlet side of said heating pipe 103 leads city water to the heating pipe 103, and connected to this feed water piep 104 are a check valve 105, a safety valve 106 which works when pressure in the pipe peses abnormally, a constant flow switch 108 to detect the flow of water and control ON and OFF of the heater 102 in order from the upstram side. The aforementioned hot water supply pipe 22A connected to the end on the outlet side of the heating pipe 103 connects a hot water temperature sensor 109 which detects temperature of hot water and controls conductivity of the heater 102, a manual drain valve 110 and the above-mentioned hot water supply solenoid valve 24 in order. 111 is overheating preventing thermostat which turns off the heater 102 forcibly when temperature of hot water rises abnormally owing to trouble of the hot water temperature sensor 109 or for some reason.

Such hot water supply system 22 is connected to the dispensing device 6 by the use of the connector 23 when the inside of the dispensing device 6 is cleaned and sterilized as mentioned above. As shown in detail in FIG. 8, formed in this connector 23 are a lateral passage 23E having an inlet 23E1 at one end, the first longitudinal passage 23A extending upward at a suitable space from said passage 23E and having an exit 23A1 at the upper surface, the second longitudinal passage 23B having an exit 23B1, the third longitudinal passage 23C having an exit 23C1 and the fourth longitudinal passage 23D having an exit 24D1. Self-sealing couplings 23A2, 23B2, 23C2 and 23D2 which can be connected to the self-sealing couplings 14A3 through 14D3 at the end of the transparent pipes 14A1 through 14D1 are provided at the exits 23A1 through 23D1 of each longitudinal passage 23A through 23D. A self-sealing coupling 112A which can be connected to a self-sealing coupling 22A1 at the end of the hot water supply pipe 22A fixed to the front plate 53A of the maid body 53 is provided at the end of a flexible connecting pipe 112 extending from the inlet 23E1 of the lateral passage 23E.

Next, the circuitry of this invention will be explained with reference to the system block diagram in FIG. 9. 113 is an automatic return type freezing switch. 231 is a power on detecting circuit where a signal of "H" is output after the power turned on to this systems is detected and then with the signal "H" input to a reset terminal 231A the output signal turns to "L". 232 is an AND circuit to input the output of the first switch circuit 114 and the output of the detecting circuit 231 through an inverter 233. 234 is an AND circuit to input the output of the first switch circuit 114 and the output of the detecting circuit 231. 114 is the first switch circuit to generate a fixed output pulse when the freezing switch 113 is closed. 115 is an automatic return type chilling switch. 116 is the second switch circuit to generate a fixed output pulse when the chilling switch 115 is closed. 117 is a latch circuit having input ports $D_0$, $D_1$, $D_2$ and $D_3$ and output ports $Q_0$, $Q_1$, $Q_2$ and $Q_3$ which correspond to these input ports. In this latch circuit 117, when an "H" level signal is input to an input port, the signal is latched and it is output from a corresponding output port and at the same time the signal so far latched is released. Thus the output of the AND circuit 232 is connected to the input port $D_0$ of the latch circuit 117, the output of the AND circuit 234 is connected to the input port $D_1$ and the output of the second switch circuit 116 is connected to the input port $D_2$ of the latch circuit 117. The output port $Q_0$ of the latch circuit 117 is connected through an inverter 118 to the first timer circuit 119 which starts with an "L" level input signal and the output of said timer circuit 119 is connected to the input port $D_1$. Furthermore, the output port $Q_0$ is connected to a cleaning circuit 120 which is cleaning control means mentioned in detail later. The output of said cleaning circuit 120 controls the above-mentioned hot water supply solenoid valve 24 and the sheath heater 102. The output port $Q_1$ is connected to the other input of an AND circuit 132 which inputs through an inverter 131 the output of the cleaning circuit 120 which controls the hot water supply solenoid valve 24 and at the same time the output port $Q_1$ is connected to the reset terminal 231A of the power on detecting circuit 231 in order to release the output signal "H" of the power on detecting circuit 231. The output of the AND circuit 132 is connected to frozen control means, that is, a freezing curcuit 121 mentioned in detail later. Said freezing ciruit 121 controls the front and rear compressors 25 and 33, the front and rear freezing solenoid valves 29 and 37 and the agitator motor 73. The output port $Q_2$ is connected to a sterilizing circuit 122 which is sterilization control means mentioned in detail later and said sterilizing circuit 122 controls the front and rear compressors 25 and 33, the front and rear hot gas solenoid valves 46 and 48 and the above-mentioned surface-shaped heater 101. The output port $Q_3$ is connected to chilled control means, that is, a chilling circuit 123 mentioned in detail later and the output of said chilling circuit 123 controls the front compressor 25, the front freezing solenoid valve 29 and the agitator motor 73. The output of the sterilizing circuit 122 is connected to one input of a NAND circuit 125 through an inverter 124 and the output of the output port $Q_2$ is connected to the other input of the NAND circuit 125. The output of this NAND circuit 125 is connected to the cleaning circuit 120 through an inverter 126 and at the same time it is connected to the input of the second timer circuit 127 which starts with an "L" level input signal. The output of said timer circuit 127 is connected to the input port $D_3$. Furthermore, the output of a NOR circuit 128 which inputs the output of the output ports $Q_0$ through $Q_3$, the output of the freezing circuit 121, the output of the output ports $Q_0$ and $Q_2$ and the output of the chilling circuit 123 are input to an OR circuit 129. The output of this OR circuit 129 is input to the third timer circuit 130 which starts with an "L" level input signal and the output of said timer circuit 130 controls the agatator motor 73.

Figure 10:
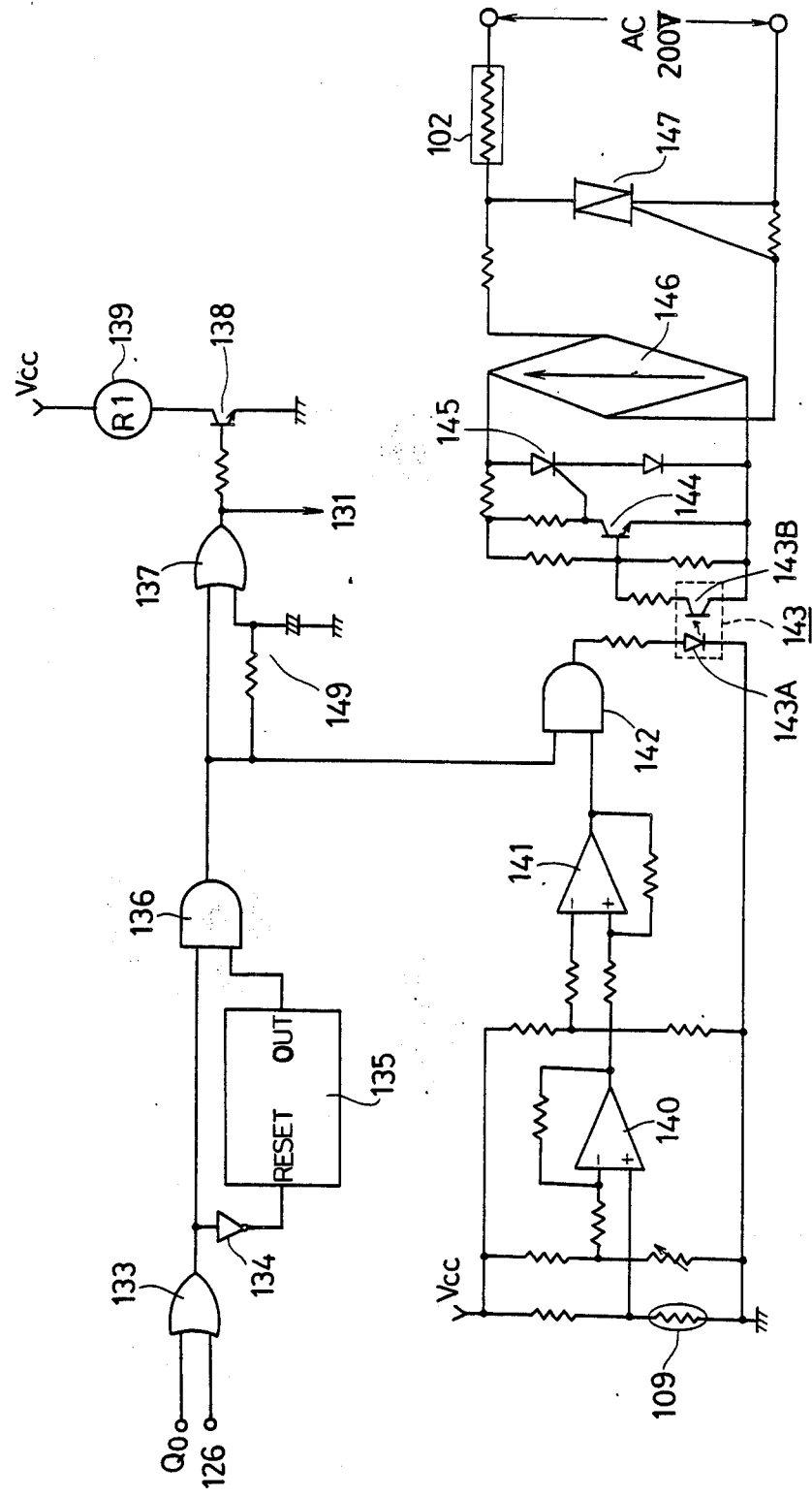
FIG. 10 is a diagram of the internal circuit of the cleaning circuit shown in the above-mentioned block diagram.

Next, the internal circuitry of the above-mentioned main blocks will be described. FIG. 10 shows the internal circuitry of the cleaning circuit 120. The output port $Q_0$ of the latch circuit 117 and the output of the above-mentioned inverter 126 are input to an OR circuit 133. The output of this OR circuit 133 starts with an "L" level input signal through an inverter 134. After starting, it is connected to the reset input of a timer circuit 135 which repeatedly outputs "L" of $T_1$ time (30 seconds in the case of the embodiment) and "H" of $T_2$ time (3 minutes in the case of the embodiment) and the output of said timer circuit 135 and the output of the OR circuit 133 are input to an AND circuit 136. An OR circuit 137 inputs the output of the AND circuit 136 through an integral circuit 149 composed of a resistance and a condenser. The output of the OR circuit 137 is connected to the base of a transistor 138 and the above-mentioned inverter 131. The first relay 139 is connected to the collector line of the transistor 138. On the other hand, unbalanced voltage set up in a bridge circuit which includes the hot water temperature sensor 109 using a thermistor is amplified by an amplifier 140 and input to a plus input terminal of a switching circuit 141. The output of the switching circuit 141 and that of the above-mentioned and circuit 136 are input to an AND circuit 142. 143 is a photo coupler composed of a light emitting element 143A which emits light when the output of the AND circuit 142 is "H" and a light receiving element 143B. 144 is a transistor which is turned off when the light receiving element 143B is turned on. 145 is a thyristor which is triggered and turned on when said transistor 144 is turned off. 146 is a rectifier. 147 is a Triac. 102 is the above-mentioned sheath heater connected in series to said Triac 147.

Figure 11:
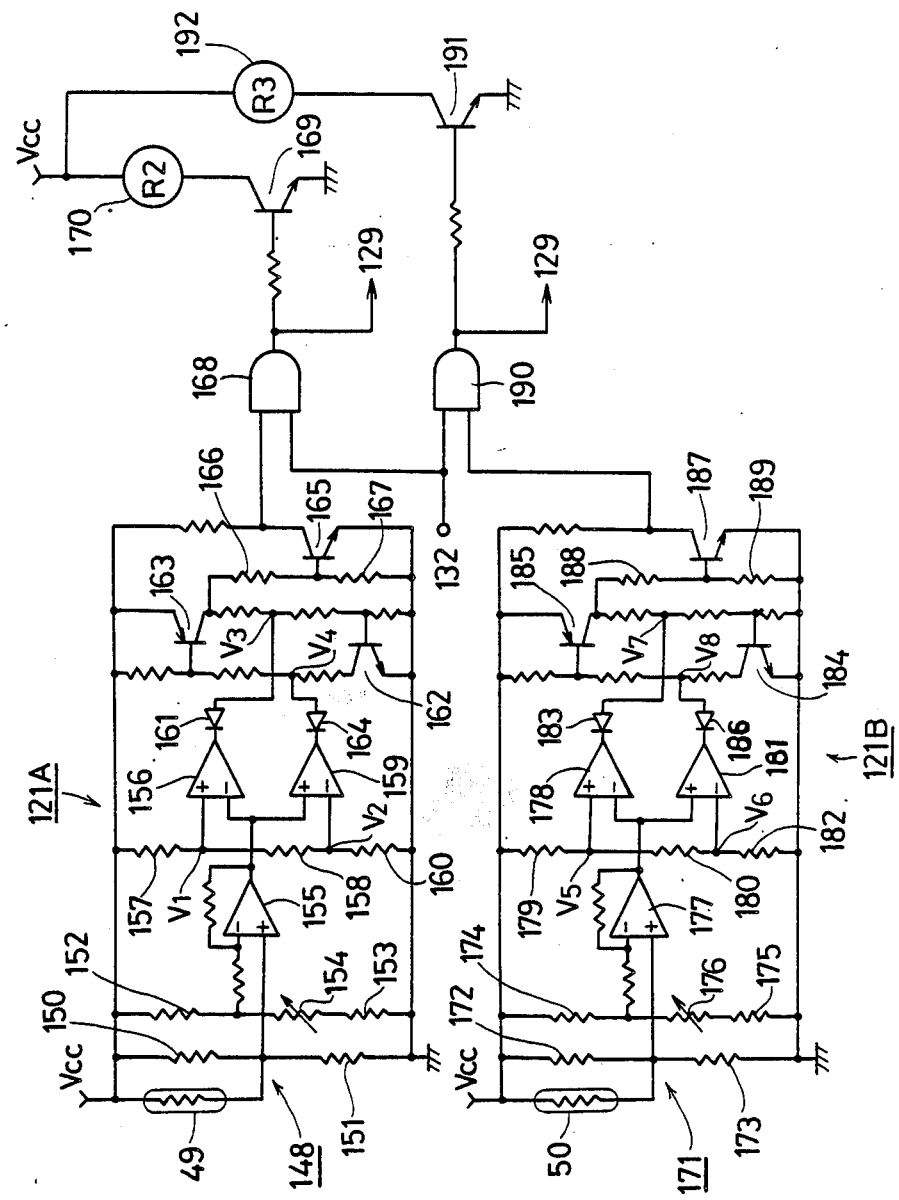
FIG. 11 is a diagram of the internal circuit of the freezing circuit shown in the above-mentioned block diagram.

FIG. 11 shows the internal circuitry of the freezing circuit 121. Said freezing circuit 121 is composed of a front freezing circuit 121A which is the first frozen control means to control the above-mentioned freezing system independently and a rear freezing circuit 121B which is the second frozen control means to control the rear freezing system independently. 148 in the front freezing circuit 121A is a bridge circuit composed of the above-mentioned thermistor 49, resistances 150, 151, 152 and 153 and a variable resistance 154 for controlling preset temperature. 155 is an amplifier to amplify unbalanced voltage set up at the bridge circuit according to the change in a resistance value of the front thermistor 49. 156 is a comparator where a middle point of resistance 157 and 158 is connected to the plus input terminal and the output of the amplifier 155 is connected to the minus input terminal. 159 is a comparator where the output of the amplifier 155 is connected to the plus input termianl and a middle point of resistances 158 and 160 is connected to the minus input terminal. The output of said comparator 156 is connected between the base of a transistor 162 and the collector of a transistor 163 through a diode 161. The output of the comparator 159 is connected between the collector of the transistor 162 and the base of the transistor 163 through a diode 164. 165 is a transistor connected through dividing resistance 166 and 167 which are connected between the collector of the transistor 163 and the ground. The collector output of said transistor 165 and the output of said AND circuit 132 are connected to the input of an AND circuit 168 and the output of the AND circuit 168 is connected to the base of a transistor 169 and the input of said OR circuit 129. The second relay 170 is connected to the collector line of the transistor 169.

On the other hand, 171 in the rear freezing circuit 121B is a bridge circuit composed of said rear thermistor 50, resistances 172, 173, 174 and 175 and a variable resistance 176 for controlling preset temperature. 177 is an amplifier to amplify unbalanced voltage set up at the bridge according to the change in a resistance value of the rear thermistor 50. 178 is a comparator where a middle point of resistances 179 and 180 is connected to the plus input terminal and the output of the amplifier 177 is connected to the minus input terminal. 181 is a comparator where the outut of the amplifier 177 is connected to the plus input terminal and a middle point of resistances 180 and 182 is connected to the minus input terminal. The output of said comparator 178 is connected between the base of a transistor 184 and the collector of a transistor 185 through a diode 183. The output of the comparator 181 is connected between the collector of the transistor 184 and the base of a transistor 185 through a diode 186. 187 is a transistor connected through dividing resistances 188 and 189 which are connected between the collector of the transistor 185 and the ground. The collector output of said transistor 187 and the output of said AND circuit 132 are connected to the input of an AND circuit 190 and the output of said AND circuit 190 is connected to the base of a transistor 191 and the input of said OR circuit 129. The third relay 192 is connected to the collector line of the transistor 191.

The difference between the front freezing circuit 121A and the rear freezing circuit 121B explained above is in that the rear freezing circuit 121B is turned on and off at a little higher temperature than the front freezing circuit 121A through the variable resistances 154 and 176. In the embodiment the front freezing circuit 121A is set so that it stops freezing when the front thermistor 49 detects $-3.1°$ C. and starts freezing when it detects $-3.0°$ C. The rear freezing circuit 121B is set so that it stops freezing when the rear thermistor 50 detets $-1.5°$ C. and starts freezing when it detects $-1.4°$ C.

Figure 12:
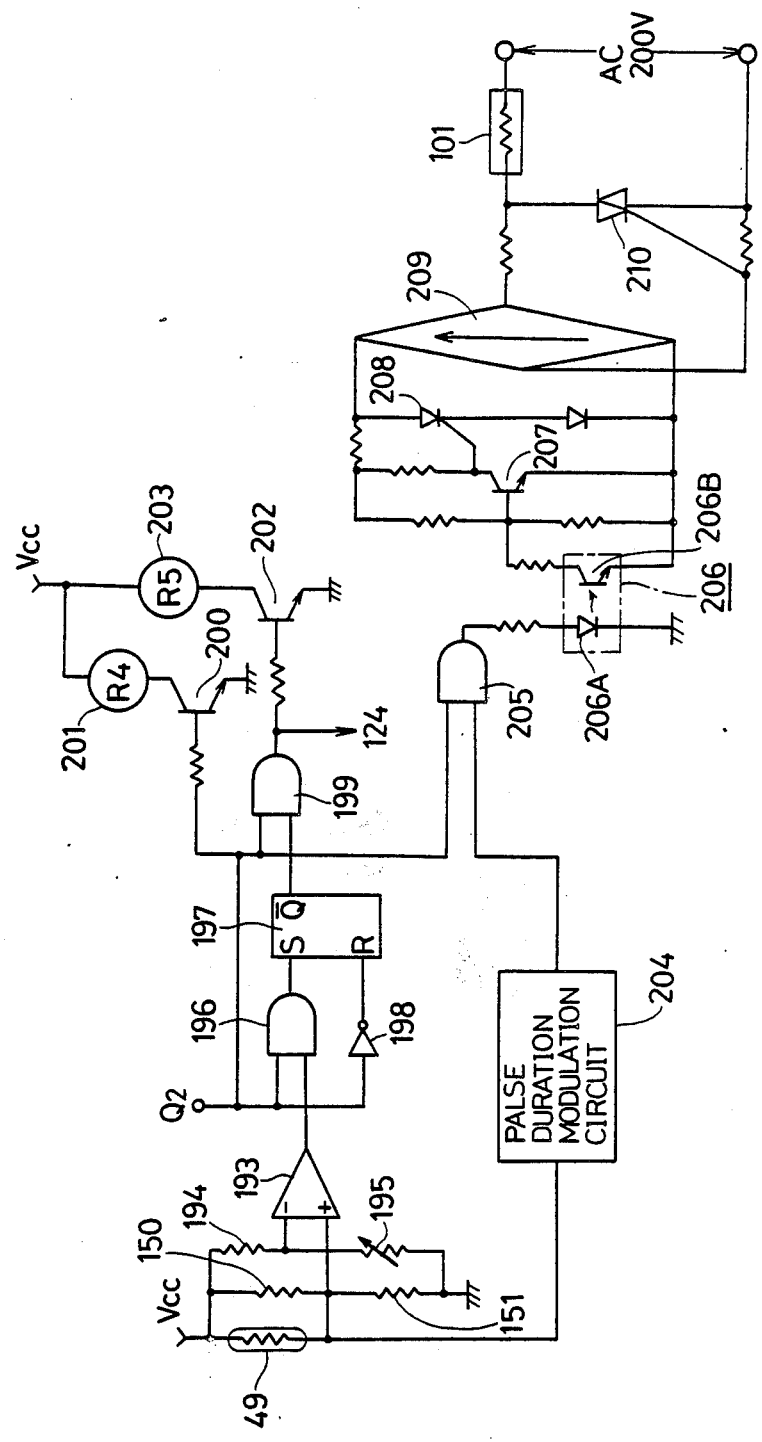
FIG. 12 is a diagram of the internal circuit of the sterilizing circuit shown in the above-mentioned block diagram

FIG. 12 shows the internal circuitry of said sterilizing circuit 122. 193 is an comparator where variable voltage set up at the front thermistor 49 and resistances 150 and 151 used in the aforementioned front freezing circuit 121A are made a plus input and reference voltage split by a resistance 194 and a variable resistance 194 for controlling preset temperature are made a minus input. 196 is an AND circuit to input the output of the comparator 193 and the output produced at the output port $Q_2$ of the above-mentioned latch circuit 117. 197 is an RS flip-flop which makes the output produced at said output port $Q_2$ the reset input through an inverter 198. 199 is an AND circuit to input the $\overline{Q}$ output of said flip-flop 197 and the output of the output port $Q_2$. 200 is a transistor whose base is connected to the output port $Q_2$ 201 is the fourth relay connected to the collector line of said transistor 200. 202 is a transistor where the output of the AND circuit 199 connected to the input of the above-mentioned inverter 124 is connected to the base. 203 is the fifth relay connected to the collector line of said transisitor 202. 204 is a pulse duration modulation circuit which is mainly composed of an amplifier, an oscillator and a comparator and finally outputs a pulse corresponding to variable voltage set up at the front thermistor 49 and the resistances 150 and 151. 205 is an AND circuit to input the output of said modulation circuit 204 and the output produced at theoutput port $Q_2$. 206 is a photo coupler composed of a light emitting element 206A which emits light when the output of an AND circuit is "H" and a light receiving element 106B. 207 is a transistor which is turned off when the light receiving element 206B is turned on. 208 is a thyristor which is triggered and turned on when the transistor 207 is turned off. 209 is a rectifier. 210 is a Triac. 101 is the above-mentioned surface-shaped heater for heating the freezing chamber 5 connected in series to the Triac 210.

Figure 13:
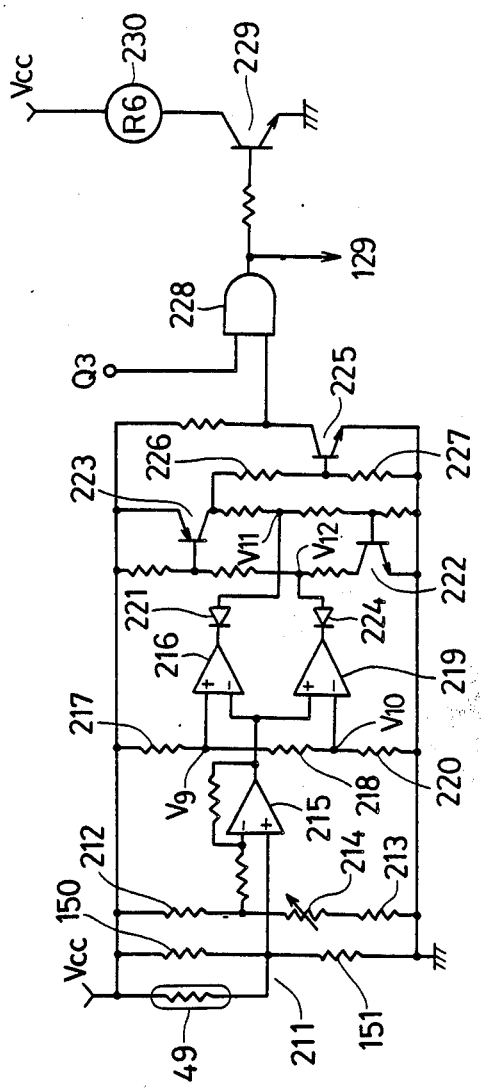
FIG. 13 is a diagram of the internal circuit of the chilling circuit shown in the above-mentioned block diagram.

FIG. 13 shows the internal circuitry of said chilling circuit 123. This circuit 123 has the same composition as the above-mentioned front freezing circuit 121A. 211 is a bridge circuit composed of said front thermistor 49, the above-mentioned resistances 150 and 151, resistances 212 and 213 and variable resistance 214 for controlling set temperature. Out of them the front thermistor 49 and the resistance 150 and 151 are used in common with the above-mentioned front freezing circuit 121A. 215 is an amplifier to amplify unbalanced voltage set up at the bridge circuit according to the change in a resistance value of the front thermistor 49. 216 is a compartor where a middle point of resistances 217 and 218 is connected to the plus input terminal and the output of the amplifier 215 is connected to the minus input terminal. 219 is a comparator where the output of the amplifier 215 is connected to the plus input terminal and a middle point of resistances 218 and 220 is connected to the minus input terminal. The output of the above-mentioned comparator 216 is connected between the base of a transistor 222 and the collector of a transistor 223 through a diode 221. The output of the comparator 219 is connected between the collector of the transistor 222 and the base of a transistor 223 through a diode 224. 225 is a transistor connected through dividing resistances 226 and 227 which are connected between the collector of the transistor 223 and the ground. The collector output of said transistor 225 and the output of the above-mentioned output port $Q_3$ are connected to the input of an AND circuit 228. The output of said AND circuit 228 is connected to the base of a transistor 229 and the input of the above-mentioned OR circuit 129. The sixth relay 230 is connected to the collector line of the transistor 229. The difference between the chilling circuit 123 and the above-mentioned freezing circuit 121 is in that the chilling circuit 123 controls temperature of liquid mix at a higher temperature than the freezing circuit 123, that is, a chilling temperature. In the embodiment the chilling circuit 123 is preset through the vaiable resistance 214 so that it stops freezing when the front thermistor 49 detects 1° C. and re-starts freezing when it detects 2° C.

Figure 9:
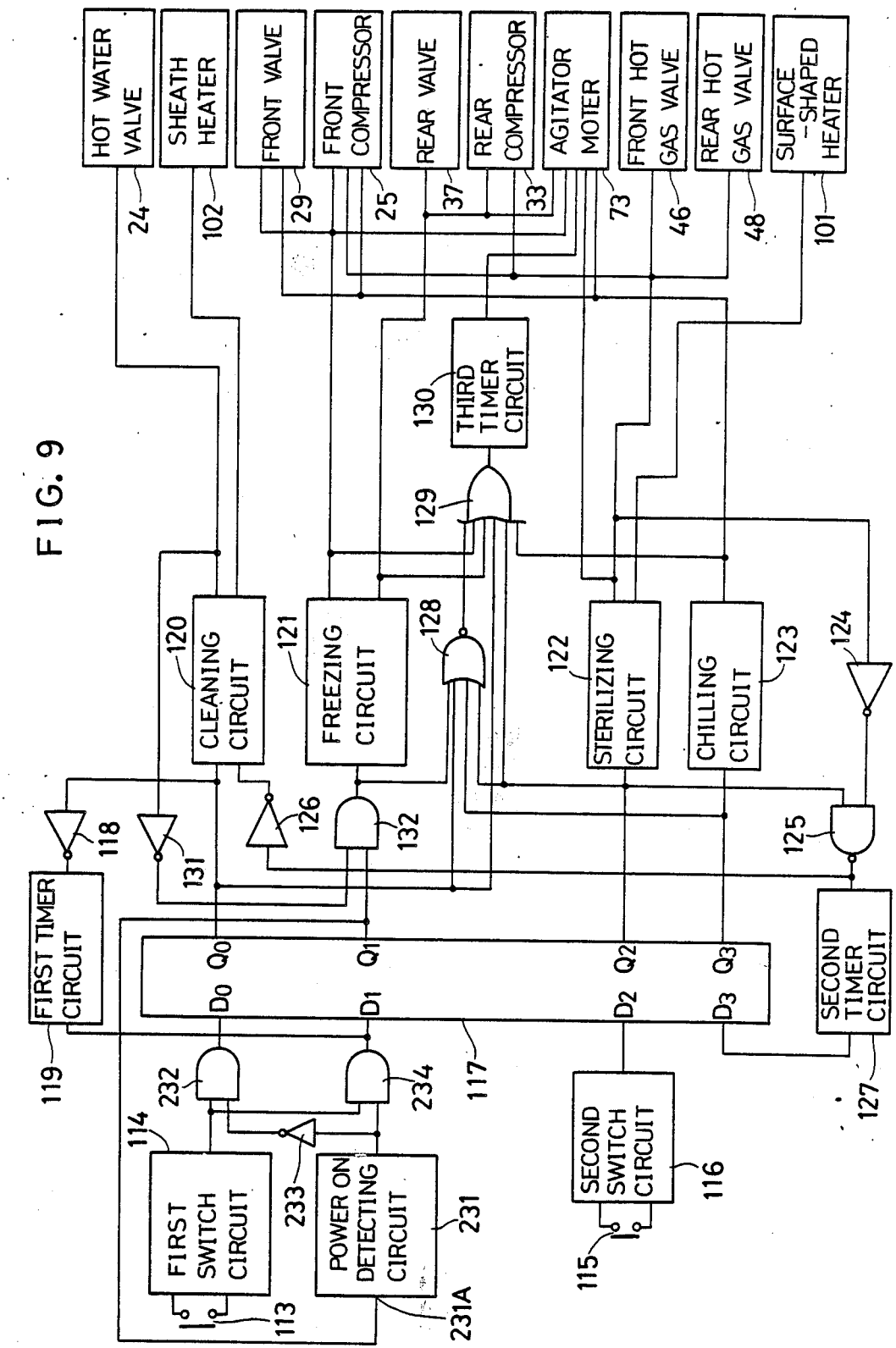
FIG. 9 is a system block diagram of the circuitry of this invention.
Figure 14:
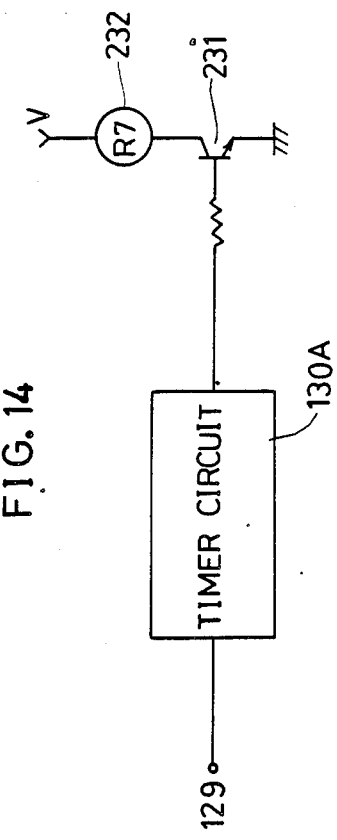
FIG. 14 is a diagram of the internal circuit of the third timer circuit shown in the above-mentioed block diagram.

In the block diagram in FIG. 9, the first timer circuit 119 and the second timer circuit 127 output "H" after the lapse of a fixed time (in the case of the embodiment, 30 minutes in either case) after start. As shown in FIG. 14, the third timer circuit 130 is equipped with a timer element 130A which repeatedly outputs "L" of $T_3$ time (in the case of the embodiment, 3 minutes) and "H" of $T_4$ time (in the case of embodiment, 30 seconds) after start, a transistor 231 controlled by the output of said timer element 130A and the seventh relay 232 connected to the collector line of said transistor 231.

Figure 15:
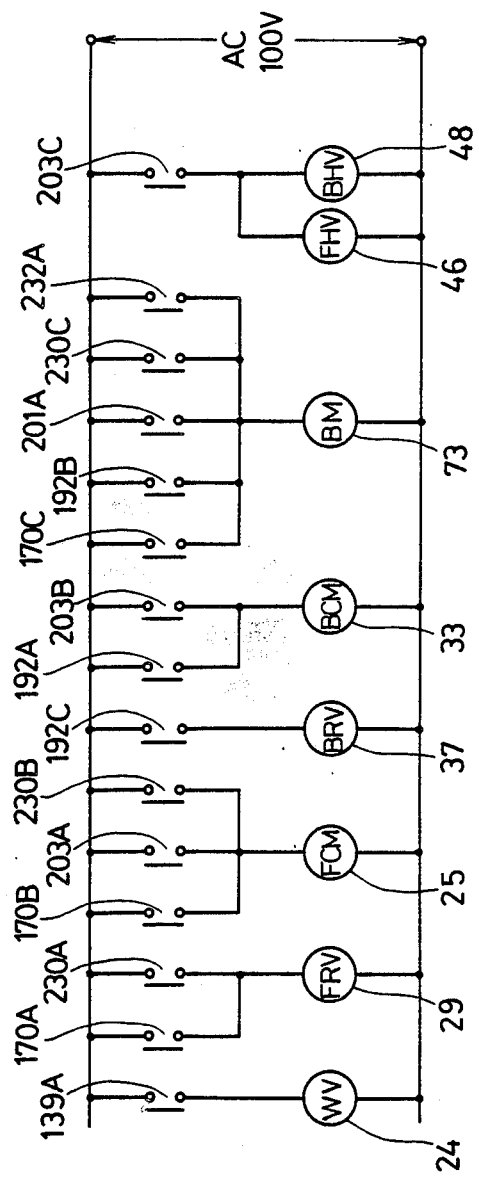
FIG. 15 is a diagram of the circuit to show the connecting relation between the relay contacts opened and closed by each relay shown in FIGS. 10 through 14 and each device.

The relay contacts opened and closed by the above-mentioned first through seventh relays 139, 170, 192, 201, 203, 230 and 232 are connected to each equipment as shown in FIG. 15. Namely, the above-mentioned hot water supply solenoid valve 24 is connected in series to a normally open contact 139A of the first relay 139. The above-mentioned front freezing solenoid valve 29 is connected in series to the parallel cirucit of a normally open contact 170A of the second relay 170 and a normally open contact 230A of the sixth relay 230. The above-mentioned front compressor 25 is connected in series to the parallel circuit of a normally open contact 170B of the second relay 170, a normally open contact 203A of the fifth relay 203 and a normally open contact 230B of the sixth relay 230. The above-mentioned rear freezing solenoid valve 37 is connected in series to a normally open contact 192C of the third relay 192. The above-mentioned rear compressor 33 is connected in series to the parallel circuit of a normally open contact 192A of the third relay 192 and a normally open contact 203B of the fifth relay 203. The above-mentioned agitator motor 73 is connected in series to the parallel circuit of a normally open contact 170C of the second relay 170, a normally open contact 192B of the third relay 192, a normally open contact 201A of the fourth relay 201, a normally open contact 230C of the sixth relay and a normally open contact 232A of the seventh relay 232. The parallel circuit of the above-mentioned front hot gas solenoid valve 46 and rear hot gas solenoid valve 48 is connected in series to a normally open contact 203C of the fifth relay 203.

Next, the movements of this invention will be explained in accordance with the above composition. After the power is turned on to the whole system, the pumping equipment 17 starts running and liquid mix in the mix tank 1 is sucked from the suction pipe 18 with proper quantity of air sucked through the air intaking pipe 21 and they are supplied to the freezing chamber 5 from the liquid mix inlet 5A at the rear of said freezing chamber through the mix supply pipe 19. When a fixed amount of liquid mix is supplied in the freezing chamber 5, the pumping equipment 17 stops running and thus supply of liquid mix is over.

On the other hand, with the power turned on to the system the power on detecting circuit 231 is outputting an "L" level signal. Thus one onput of the AND circuit 232 is in the state of "L" and one input of the AND circuit 234 is in the state of "H". When the freezing switch 113 is pressed in this condition, an output pulse is generated from the first switch circuit 114 and input to both and circuits 232 and 234. Therefore, the output of the AND circuit 232 whose one input is "L" becomes "L" and the output of the AND circuit 234 whose one input is "H" becomes "H". With this, "H" is input to the input port $D_1$ of the latch circuit 117 and "H" is output from the output port $Q_1$ which corresponds to the above-mentioned port. The output of the AND circuit 132 which inputs the above-mentioned output and the output of the inverter 131 which is "H" at this time becomes "H" and input to the freezing circuit 121 and operation of the freezing system is started. The concrete movements will be explained with reference to FIG. 11. In the front freezing circuit 121A, temperature of liquid mix just after supplied to the freezing chamber 5 is comparatively high. Therefore, a resistance value of the front thermistor 49 is small. For this reason the plus input voltage of the amplifier 155 is high and the output becomes high. The output of this amplifier 155 is input to the minus input terminal of the comparator 156 and the plus input terminal of the comparator 159. It has been set beforehand that output voltage of the amplifier 155 becomes higher than fixed voltage $V_1$ and $V_2$ when temperature of liquid mix is higher than preset temperature and that said output voltage becomes lower than fixed voltage $V_1$ and $V_2$ when temperature of liquid mix is lower than preset temperature. With this arrangement the output of the comparator 156 becomes "L" and that of the comparator 159 becomes "H". At this time, as voltage of $V_3$ is drawn to "L" through the diode 161, the transistor 162 becomes off. Owing to reverse bias of the diode 164, voltage of $V_4$ becomes "H" with the transistor 162 turned off and the transistor 163 also becomes off. Furthermore, as collector voltage of the transistor 163 is "L", the transistor 165 also becomes off. Therefore, collector voltage of the transistor 165 becomes "H".

On the other hand, the rear freezing circuit 121B has the same movements as the front freezing circuit 121A. As the rear thermistor 50 detects higher temperature of liquid mix than preset temperature, collector voltage of the transistor 187 becomes "H" in the long run.

With this, the output of the AND circuit 168 which inputs the output of the AND circuit 132 and collector voltage of the transistor 165 becomes "H" and the output of the AND circuit 190 which inputs the output of the AND circuit 132 and collector voltage of the transistor 187 also becomes "H". Therefore, the transistors 169 and 191 are turned on and the second relay 170 and the third relay 192 are excited and close the normally open contacts 170A, 170B, 170C, 192A, 192B and 192C shown in FIG. 15. With this, the front compressor 25 is driven, the front freezing solenoid valve 29 opens and freezing operation with the front freezing system is started. At the same time, the rear compressor 33 is driven, the rear freezing solenoid valve 37 opens and freezing operation with the rear freezing system is also started. Furthermore, the agitator motor 73 is driven to rotate the agitator 68.

As liquid mix supplied to the freezing chamber 5 is cooled in this way, it increases its viscosity and hardens gradually and is finished as the base of ice-cream shake of semi-frozen. As temperature of this shake base lowers, resistance values of the front termistor 49 and the rear thermistor 50 increase. As preset temperature in the rear freezing circuit 121B is higher than in the front freezing circuit 121A, the rear thermistor 50 detects a fixed lowering temperature ($-1.5°$ C.) first. With this, plus input voltage of the amplifier 177 is lowered and output voltage of the amplifier 177 is also lowered. At this time, output voltage of the amplifier 177 becomes lower than fixed voltage $V_5$ and $V_6$. The output of the comparator 178 becomes "H" and that of the comparator 181 becomes "L". With this, voltage of $V_7$ is not influenced because of reverse bias of the diode 183 but because voltage of $V_8$ is drawn by the output "L" of the comparator 181 through the diode 186, potential difference takes place between the base and the emitter of the transistor 185 and said transistor 185 is turned on. The transistor 184 is also turned on. Furthermore, as collector voltage of the transistor 185 is "H", the transistor 187 is also turned on and collector voltage of said transistor 187 becomes "L". With this, the output of the AND circuit 190 becomes "L", the transistor 191 is turned off and excitation of the third relay 192 is released. Then the normally open contacts 192A, 192B and 193C of the third relay 192 open and the rear compressor 33 stops. At the same time, the rear freezing solenoid valve 37 closes and operation of the rear freezing system is stopped.

After that, when the front thermistor 49 detects a fixed lowering temperature ($-3.1°$ C.) of the shake base, the front freezing circuit 121A works in the same way as the operation stopping movements of the above-mentioned rear freezing system and collector voltage of the transistor 165 becomes "L". With this, the output of the AND circuit 168 becomes "L", the transistor 169 is turned off and excitation of the second relay 170 is released. Then the normally open contacts 170A, 170B and 170C of the second relay 170 open and the rear compressor 25 stops. At the same time, the front freezing solenoid valve 29 opens and operation of the front freezing system is stopped.

After that, when temperature of the shake base rises and the front thermistor 49 detects a fixed rising temperature ($-3.0°$ C.), the front freezing system starts operation again. When the rear thermistor 50 detects a fixed rising temperature ($-1.4°$ C.), the rear freezing system starts operation again. However, in the case where the shake base finished in the freezing chamber 5 is not taken out at all or is scarcely taken out to the outside as a matter of fact, temperature of the shake base agitated in the freezing chaber 5 approaches set temperature of the front thermistor 49 which is lower than that of the rear thermistor 50. With this, the rear freezing system scarcely re-starts operation in such a case and operation and stop with the front freezing system are repeated. Therefore, ideal temperature of the shake base taken out of the freezing chamber 5 is set with the front freezing circuit 121A before-hand. The reason for making control temperature of the rear freezing circuit 121B higher than that of the front freezing circuit 121A will be described in detail when taking-out movements are explained later.

When operation of both front and rear freezing systems are stopped and the output of the and circuits 168 and 190 become "L", all input of the or circuit 129 shown in FIG. 9 become "L". With this, an "L" level signal is input to the third timer circuit 130, the timer element 130A shown in FIG. 14 starts and "L" of $T_3$ time (3 minutes) and "H" of $T_4$ time (30 seconds) are output repeatedly. In response to this output, the transistor 231 is turned on and off repeatedly. Furthermore, the seventh relay 232 follows this and controls the normally open contact 232A. With this, while operation of the front and rear freezing systems is stoppedl, the agitator 68 which interlocks with the agitator motor 73 agitates the shake base periodically for the above-mentioned time.

Figure 16:
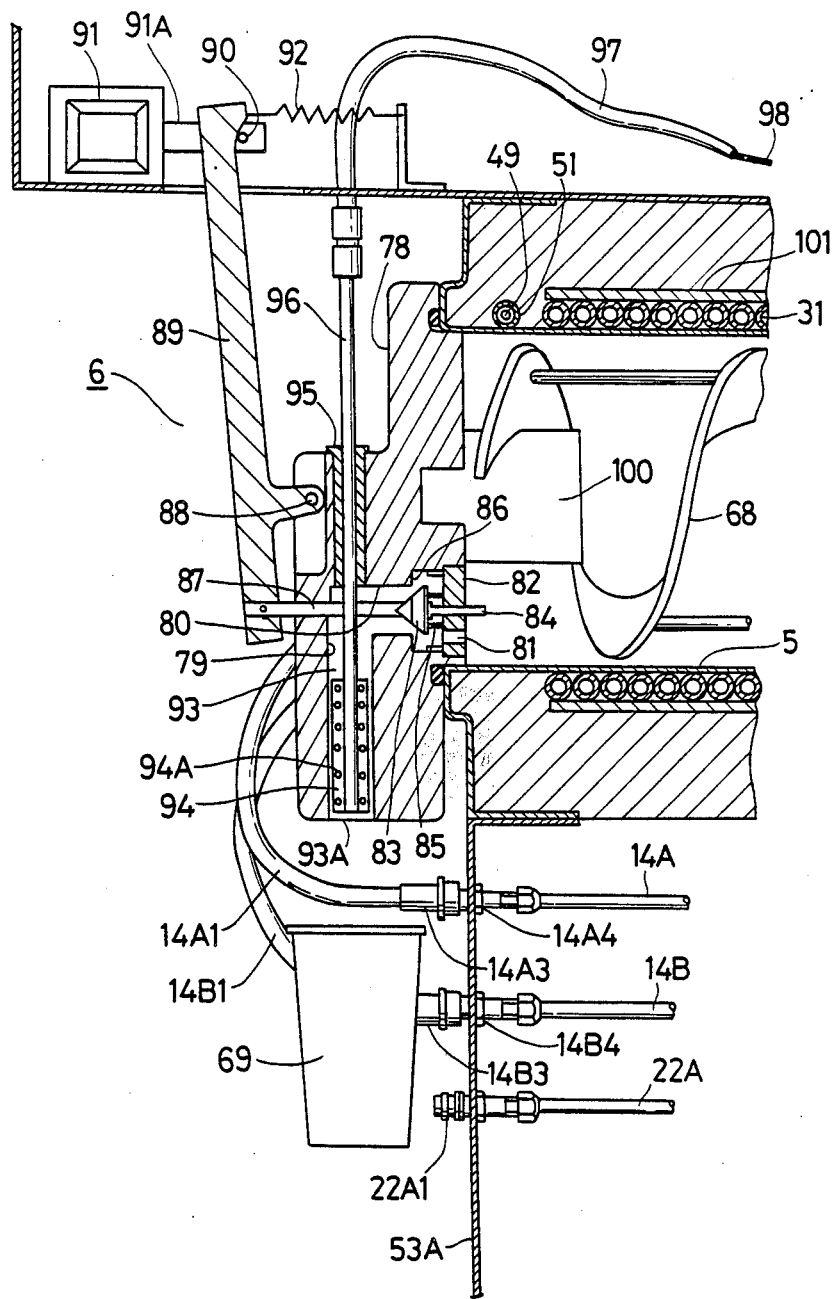
FIG. 16 is a sectional side elevation view of the dispensing device showing the taking out condition of frozen products.

Next, the taking-out movements of ice-cream shake finally made from the shake base finished in the freezing chamber 5 as mentioned above mixed with syrup is explained as following. For example, in the case where ice-cream shake with chocolate flavor is desired, by pressing a switch indicating chocolate for example, as shown in FIG. 16, the solenoid device 91 is excited, the plunger 91A is sucked and the working pin 90 pulls the lever 89 forward. Then the lever 89 rotates on the fulcrum 88 and moves the working lever 87 toward the freezing chamber 5. With the movement of this working lever 87 the valve 83 is pushed backward against the coiled spring 85 and the cave 80 is opened. With this, the shake base is fed to the mixing chamber 93 from the discharge port 81 through the cave 80 by the agitator 68. At the same time, the syrup supply solenoid valve 15A is closed and chocolate syrup in the sirup tank 3A is supplied to the mixing chamber 93 from the nozzle 14A2 through the syrup supply pipe 14A and the transparent pipe 14A1 by pressure of compressed gas which is applied to said syrup tank 3A through the pneumatic pipe 9 and the syrup pressure pipe 12A.

The shake base and chocolate syrup supplied to the mixing chamber 93 in this way are agitated and mixed at an extremely rapid speed by the impeller 94 which interlocks with the driving motor 99 and finished to ice-cream shake with chocolate flavor and then it is taken out to the cup 69 through the outlet 93A.

For the stop of taking out ice-cream shake, switch operation, weighing, time, etc. are considered. In any case, when a stop signal is given, the syrup supply solenoid valve 15A is closed first of all and feeding of chocolate syrup to the mixing chamber 93 is stopped. Then excititation to the solenoid device 91 is released and the lever 89 is returned to the normal position by the return spring 92 as shown in FIG. 5. The working lever 87 which follows this is also returned to the forward position. With this, the valve 83 is pressed to the step part 86 of the cave 80 by the coiled spring 85 and closes the cave 80.

The above explanation was given for taking out ice-cream shake with chocolate flavor. If ice-cream shake with strawberry flavor is desired, the syrup supply solenoid valve 15B is opened. If ice-cream shake with vanilla flavor is desired, the syrup supply solenoid valve 15C is opened. If ice-cream shake with yogurt flavor is desired, the syrup supply solenoid valve 15D is opened by switch operation corresponding to each.

In the taking-out movements as mentioned above, when the shake base in the freezing chamber 5 is fed to the mixing chamber 93, the pressure detecting device 20 detects pressure fall in the freezing chamber 5 and works the pumping equipment 17 to replenish liquid mix to the freezing chamber 5. Such movement to replenish liquid mix corresponds to the taking-out of ice-cream shake. Especially when ice-cream shake is taken out successively, large quantity of liquid mix is replenished to the freezing chamber 5 at a time.

In such a case, the above-mentioned rear freezing circuit 121B works effectively. Namely, in the rear freezing circuit 121B whose set temperature is higher than the front freezing circuit 121A, the rear thermistor 50 promptly detects sudden temperature rise owing to supply of large quantity of liquid mix. Thus freezing operation of the rear freezing system is started and it is possible to approach the shake base with ideal viscosity promptly.

With the above explanation the freezing movements and the ice-cream shake taking-out movements have been understood. Now the operations and movements to be made after daily taking-out work, for example, after a shop is closed, will be explained.

First, all the connections between the syrup supply pipe 14A and the transparent pipe 14A1, between the syrup supply pipe 14B and the transparent pipe 14B1, between the syrup supply pipe 14C and the transparent pipe 14C1 and between the suryp supply pipe 14D and the transparent pipe 14D1 in the state shown in FIGS. 4 and 5 are released. Also, the rotation shaft 96 is removed, the impeller 94 is removed from the mixing chamber 93 and the plain bearing 95 is also removed. These parts removed are cleaned separately and stored.

Figure 17:
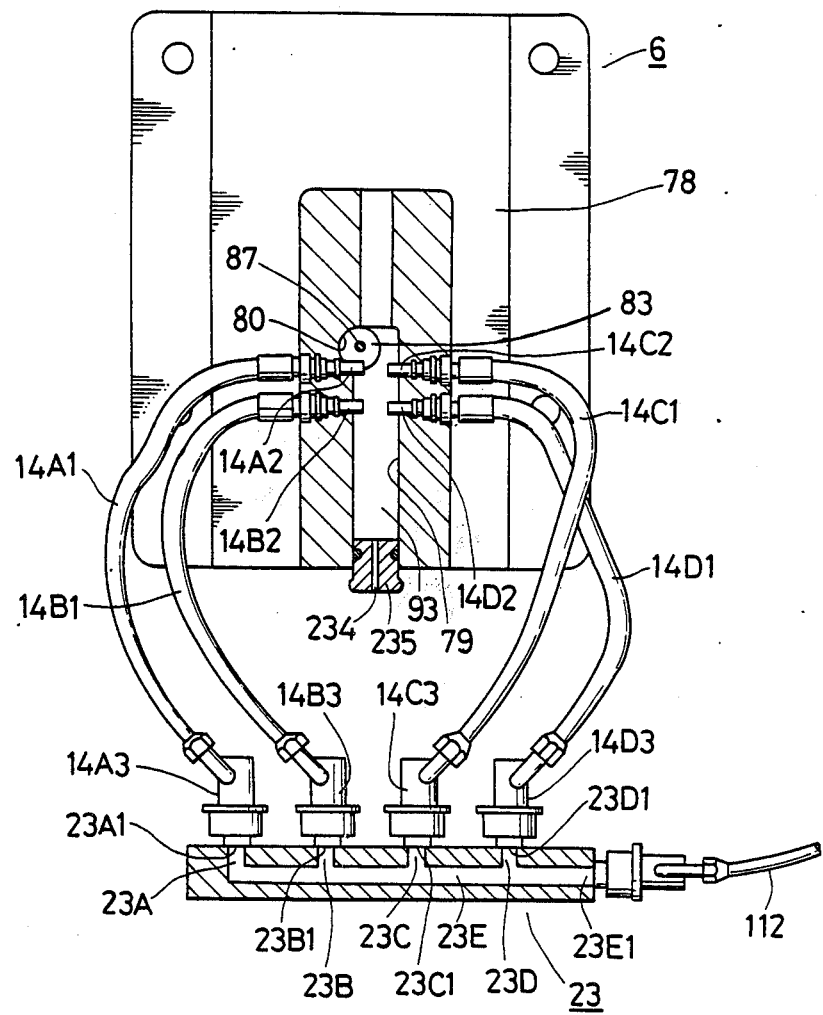
FIG. 17 is an elevational view to show the cleaning condition of the dispensing device in which the connector is used.
Figure 18:
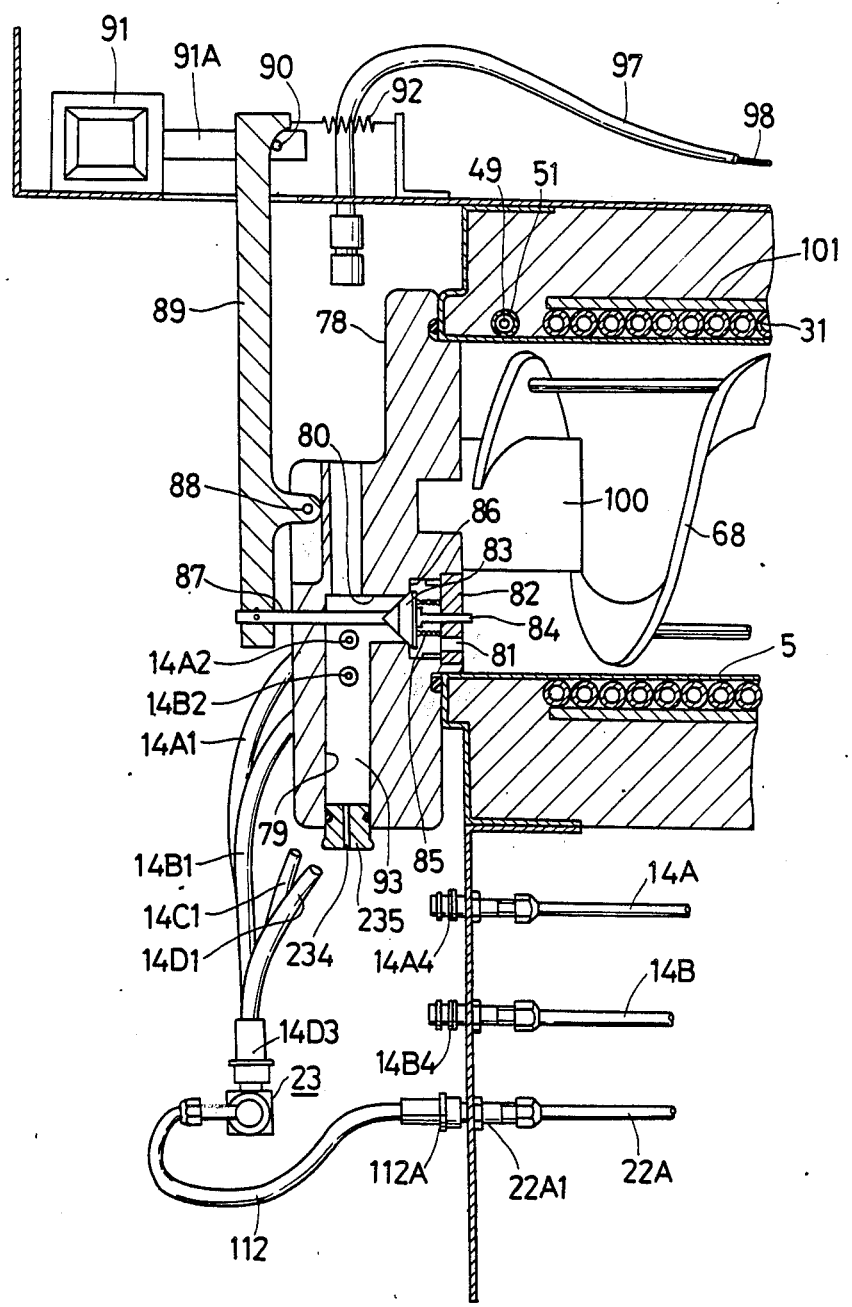
FIG. 18 is a side elevation view showing the cleaning condition of the dispensing device.

After that, as shown in FIGS. 17 and 18, the self-sealing couplings 14A3 through 14D3 at the end of the transparent pipes 14A1 through 14D1 are connected to the self-sealing couplings 23A2 through 23D2 provided on the exit side of the prearrange connector 23. Furthermore, the self-sealing couplings 112A provided at the end of the connecting pipe 112 which extends from the inlet side of the connector 23 is connected to the self-sealing coupling 22A1 provided at the end of the hot water supply pipe 22A. And a cap 235 which forms a hot water discharge passage 234 with small diameter passing through the inside and the outside of the mixing chamber 93 is fitted to the taking-out part of the mixing chamber 93.

After the above work is finished, by pressing the chilling switch 115, and output pulse is generated from the second switch circuit 116 and input to the input port $D_2$ of the latch circuit 117. Then "H" is output from the output port $Q_2$ of the latch circuit 117 which corresponds to this and the output of the output port $Q_1$ becomes "L". With this, the freezing movements by the freezing circuit 121 is finished and the sterilizing circuit 122 which receives the output "H" of the output port $Q_2$ starts the sterilizing movements. The concrete movements will be explained with reference to FIG. 12. First, the transistor 200 receives the output "H" of the output port $Q_2$ and is turned on. Then the fourth relay 201 is excited and closes the normally open contact 201A. With this, the agitator motor 73 is driven and the agitator 68 rotates. The rotation of this agitator 68 continues until the output "H" of the output port $Q_2$ is interrupted. On the other hand, since temperature of liquid mix is naturally low immediately after the sterilizing movement is started, a resistance value of the front thermistor 49 is large. Thus plus input voltage of the comparator 193 beocmes low. As this is lower than minus input voltage, output voltage of the comparator 193 becomes "L". With this, the output "L" of the and circuit 196 is input to the set input termianl of the flip-flop 197. As the reversed output "L" of the output port $Q_2$ is input to the reset input terminal by the inverter 198, the $\overline{Q}$ output voltage of the flip-flop 197 becomes "H". With this, the transistor 202 is turned on, the fifth realy 203 is excited and the normally open contacts 203A, 203B and 203C are closed. Therefore, the front and rear compressors 25 and 33 are operated and the front and rear hot gas solenoid valves 46 and 48 are opened.

Thus high temperature refrigerant gas, that is, hot gas is circulated to the evaporative pipes 31 and 39 through the bypass pipes 45 and 47 and the freezing chamber 5 and liquid mix in it are heated.

On the other hand, as temperature of liquid mix is the lowest immediately after the sterilizing movement is started, input voltage of the pulse duratio modulation circuit 204 is extremely low and the output pulse width of "H" of said modulation circuit 204 becomes long. The output of the AND cirucit 205 which receives this output and the output of the output port $Q_2$ becomes "H". And current flows through the light emitting element 206A and it emits light. The light receiving element 206B is turned on. With this, as the transistor 207 is turned off, collector voltage of said transistor 207 becomes "H" and the thyristor 208 is triggered and turned on. With said thyristor 208 turned on, the Triac 210 is also turned on. 200 V A.C. is applied to the surface-shaped heater 101 and said heater generates heat.

As mentioned above, by pressing the chilling switch 115, hot gas is circulated in the evaporative pipes 31 and 39. At the same time, the heater 101 is energized and the sterilizing movement is started to heat the freezing chamber 5 and liquid mix in said chamber 5 with hot gas and the heater 101.

As the saterilizing movement advances, temperature of liquid mix rises gradually. When the thermistor 49 detects a fixed sterilizing temperature (in the embodiment, a preset temperature not to give out smell of burning, for example, 75° C.), plus input voltge of the comparator 193 becomes higher than minus input voltage and the output of the comparator 193 changes from "L" to "H". Then the output of the and circuit 196 becomes "H". As this is input to the set input terminal of the flip-flop 197, the $\overline{Q}$ input of the flip-flop 197 becomes "L". With this, the output of the AND circuit 199 becomes "L" and the transistor 202 is turned off. Excitation of the fifth relay 203 is released and the normally open contacts 203A, 203B and 203C are opened. Therefore, operation of the front and rear compressors 25 and 33 is stopped and the front and rear hot gas solenoid valves 46 and 48 are also closed. When temperature of liquid mix reaches a fixed sterilizing temperature in this way, firstly heating of liquid mix with hot gas is finished. However, heating of liquid mix with the heater 101 continues based on the output of the pulse duration modulation circuit 204 as far as the output "H" of the output port which is one input of the AND circuit 205 is not interrupted.

Namely, as temperature of liquid mix approaches sterilizing temperature, input voltage of the pulse duration modulation circuit 204 becomes higher. As a result, the intervals of the output pulse "H" of said modulation cirucit 204 become shorter gradually and the intervals of "L" become longer gradually. Thus when "H" is output from said modulation circuit 204, the heater 101 is energized as mentioned above. When "L" is output from the modulation circuit 204, the output of the AND circuit 205 becomes "L". The light emitting element 206A will not emit light and the light receiving element 206B is turned off. With this, as the transistor 207 is turned on, the collector voltage becomes "L" and the thyristor 208 is turned off. Furthermore, the Triac 210 is turned off and current flow in the heater 101 is cut off. By changing the ratio of keeping the heater 101 in conduction in this way according to temperature of liquid mix, temperature of liquid mix is kept at sterilizing temperature.

On the other hand, the output "L" of the and circuit 199 at the time of a fixed sterilizing temperature is input to the inverter 124 as shown in FIG. 9. The output of the NAND circuit 125 which inputs the reversed output "H" by said inverter 124 and the output "H" of the output port $Q_2$ becomes "L" and the second timer circuit 127 which receives this output is started. Furthermore, as the output "L" of the NAND circuit 125 is reversed by the inverter 126 and input to the cleaning circuit 120, said cleaning circuit 120 starts the movements. The concrete movements will be explained with reference to FIG. 10. The output "H" of the inverter 126 is input to the inverter 134 through the OR circuit 133 and reversed to input an "L" level signal to timer circuit 135. The timer circuit 135 which starts with this outputs "L" of $T_1$ time (30 seconds) and "H" of $T_2$ time (3 minutes) repeatedly as mentioned above. The output of the AND circuit 136 which inputs the output of this timer circuit 135 and the output of the OR circuit 133 is synchronized with the output of the timer circuit 135. Therefore, when "H" is output from the AND circuit 136, the transistor 138 is turned on through the OR circuit 137, the first relay 139 is excited, the normally open contact 139A is closed and the hot water supply solenoid valve 24 is opened.

With this, after city water which passes through the heating pipe 103 from the feed water pipe 104 is heated by the sheath heater 102 which is conducting only when the flow switch 108 is turned on, heated city water passes through the hot water supply pipe 22A, the connecting pipe 112, the inside of the connector 23 and the transparent pipes 14A1, 14B1, 14C1 and 14D1 and is discharged in the mixing chamber 93 through the nozzles 14A2, 14B2, 14C2 and 14D2. Hot water discharged in said mixing chamber 93 cleans and sterilizes the mixing chamber 93 and is discharged through a proper drain means from the hot water discharge passage 234 of the cap 235. As this passage 234 is narrow, the mixing chamber 93 is filled with hot water and it overflows from the upper opening of the pit 79. Therefore, the pit 79 and the cave 80 to the valve 83, not to mention the mixing chamber 93, are also cleaned and sterilized completely.

On the other hand, feed hot water is controlled at a uniform temperature through the hot water temperature sensor 109. When hot water reaches a set temperature (set at 75° C. in the embodiment), output voltage of the amplifier 140 becomes lower than input voltage of the comparator 141 and the output of the comparator 141 becomes "L". As the output of the AND circuit 142 which inputs this output and the output of the AND circuit 136 which outputs $T_2$ time "H" becomes "L", the light emitting element 143A will not emit light, the light receiving element 143B is turned off and the transistor 144 is turned on. With this, the thyristor 145 and the Triac 147 are turned off in order and the sheath heater 102 is turned off. When hot water temperature becomes somewhat lower than a preset temperatuue, output voltage of the amplifier 140 becomes higher than minus input voltage of the comparator 141 and the output of the comparator 141 becomes "L". As the output of the AND circuit 142 which inputs this output and the output of the AND circuit 136 becomes "H", the light emitting element 143A emits light, the light receiving element 143B is turned on and the transistor 144 is turned off. With this, th thyristor 145 and the Triac 147 are turned in order and the sheath heater 102 is turned on. In this way feed hot water is controlled at an approximately uniform temperature suitable for cleaning and sterilization.

Thus after the lapse of $T_2$ time and when the output of the AND circuit 136 becomes "L" in $T_1$ time, the output of the AND circuit 142 becomes "L". At this time the sheath heater 102 is turned off for $T_1$ time. After the lapse of delay time (several seconds) by the integral circuit 149, the output of the OR circuit 137 becomes "L" and the transistor 138 is turned off. With this, excitation of the first relay 139 is released, the normally open contact 139A is opened and the hot water supply solenoid valve 24 is closed. Such delay of the hot water supply solenoid valve 24 is effective for preventing water heated with remaining heat of the hater 102 from becoming steam and being rushed toward the mixing chamber 93.

While the above-mentioned cleaning movements are repeated, the satelizing movement of liquid mix in the freezing chamber 5 is continued by the heater 101 alone.

Thus after the lapse of a fixed time of the second timer circuit 127, said timer circuit 127 outputs "H" and inputs it to the input port $D_3$ of the latch circuit 117. Then the output of the output port $Q_3$ of the latch circuit 117 becomes "H" and the output of the output port $Q_2$ becomes "L". Therefore, the sterilizing circuit 122 stops the sterilizing movement. The output of the NAND circuit 125 which inputs the output "L" of the output port $Q_2$ becomes "H" and resets the second timer circuit 127. At the same time, the output "H" of this NAND circuit 125 is reversed to "L" by the inverter 126 and input to the cleaning circuit 120. Therefore, the cleaning circuit 120 also stops the cleaning movement.

Then the chilling circuit 123 which receives the output "H" of the output port $Q_3$ starts the chilling movement. The concrete movement will be explained with reference to FIG. 13. Temperature of liquid mix in the freezing chamber 5 is almost the same as sterilizing temperature when the sterilizing movement has just been finished. Therefore, a resistance value of the front thermistor 49 is extremely small. For this reason plus input voltage of the amplifier 215 is high and its output is also high. The output of this amplifier 215 is input to the minus input terminal of the comparator 216 and the plus input terminal of the comparator 219. It has been set before-hand that output voltage of the amplifier 215 becomes higher than fixed voltage $V_9$ and $V_{10}$ when temperature of liquid mix is higher than preset temperature and that said output voltage becomes lower than fixed voltage $V_{11}$ and $V_{12}$ when temperature of liquid mix is lower than preset temperature. With this, the output of the comparator 216 becomes "L" and the output of the comparator 219 becomes "H". At this time, as voltage of $V_{11}$ is drawn to "L" through the diode 221, the transistor 222 is turned off. Owing to reverse bias of the diode 224, voltage of $V_{12}$ becomes "H" with the transistor 222 turned off and the transistor 223 is also turned off. Furthermore, as collector voltage of the transistor 223 is "L", the transistor 225 is also turned off. Therefore, collector voltage of the transistor 225 becomes "H".

With this, the output of the AND circuit 228 inputs the output "H" of the output port $Q_3$ of the latch circuit 117 and collector voltage "H" of the transistor 225 becomes "H". Thus the transistor 229 is turned on, the sixth relay 230 is excited and the normally open contacts 230A, 230B and 230C are closed. With this, the front compressor 25 is driven, the front freezing solenoid valve 29 is closed and the chilling operation with the front freezing system is started. Furthermore, the agitator motor 73 is driven and the agitator 68 rotates.

Thus liquid mix in the freezing chamber 5 at approximately sterilizing temperature is cooled and when the front thermistor 49 detects a fixed lowering temperature (1° C.) of liquid mix, output voltage of the amplifier 215 at this time becomes lower than fixed voltage $V_9$ and $V_{19}$, the output of the comparator 216 becomes "H" and that of the comparator 219 becomes "L". With this, voltage of $V_{11}$ is not influenced by reverse bias of the diode 221. As voltage of $V_{12}$ is drawn to the output "L" of the comparator 219 through the diode 224, potential difference takes place between the base and the emitter of the transistor 223 and said transistor 223 is turned on. The transistor 222 is also turned on. Furthermore, as collector voltage of the transistor 223 is "H", the transistor 225 is also turned on and collector voltage of said transistor 225 becomes "L". With this, the output of the AND circuit 228 becomes "L". The transistor 229 is turned off. Excitation of the six relay 230 is released and the normally open contacts 230A, 230B and 230C are opened. Therefore, the front compressor stops operation and at the same time, the front freezing solenoid valve 29 is closed and chilling operation of the front freezing system is stopped. Furthermore, the agitator motor 73 is stopped and rotation of the agitator 68 stops.

After operation of the front freezing system is stopped, the output of the AND circuit 228 becomes "L". Then all input of the OR circuit 129 shown in FIG. 9 become "L". With this, an "L" level signal is input to the third timer circuit 130. The timer element 130A shown in FIG. 14 starts and "L" of $T_3$ time (3 minutes) and "H" of $T_4$ time (30 seconds) are output repeatedly. In response to this output, the transistor 231 is turned on and off repeatedly. Furthermore, the seventh relay 232 follows this and controls the normally open contact 232A. With this, the agitator 68 which is interlocked with the agitator motor 73 agitates liquid mix at the above-mentioned intervals of time while operation of the front freezing system is stopped.

After that, temperature of liquid mix rises and the front thermistor 49 detects a fixed rising temperature (2° C.). Then the front freezing system re-starts freezing operation.

As mentioned above, the chilling circuit 123 controls temperature of liquid mix inthe freezing chamber 5 as a little higher fixed chilling temperature than 0° C. and maintains mix in the liquid condition. Such chilling operation with the chilling circuit 123 is continued until the freezing switch 113 is pressed. The connection of various piping made before the chilling operation is started is kept as it is.

Thus on the next morning, for example, before a shop is opened, the freezing switch 113 is pressed. Then output pulse is generated from the first switch circuit 114 and input to the AND circuits 232 and 234. At this time, as the output of the power on detecting circuit 231 becomes "L" when "H" is output from the output port $Q_1$ of the latch circuit 117 as explained above, the other input of the AND circuit 232 becomes reverse output "H" of the inverter 233 and the other input of the AND circuit 234 becomes "L". Therefore, "H" is input to the input port $D_0$ of the latch circuit 117 and "H" is output from the output port $Q_0$, and at the same time, the output of the outport $Q_3$ becomes "L". With this, the chilling circuit 123 stops the chilling movement and the cleaning circuit 120 which receives the output "H" of the output port $Q_0$ starts the movement. For the concrete movement, as it is the same as the movement of the cleaning circuit 120 which starts from halfway of the sterilizing movement as mentioned above, explanation is omitted here.

The cleaning time with the cleaning circuit 120 is controlled by the first timer circuit 119. Namely, when "H" is output from the outport $Q_0$, this output is reversed by the inverter 118 and input to the first timer circuit 119 as an "L" level signal. The first timer circuit 119 is started. After the lapse of a fixed time (30 minutes), said timer circuit 119 outputs "H" and inputs it to the input port $D_1$. With this, "H" is output from the output port $Q_1$ and the output of the output port $Q_0$ becomes "L". The first timer circuit 119 is reset and the cleaning circuit 120 finishes the movement. Strictly speaking, after the output of the output port $Q_0$ becomes "L", when delay time with the integral circuit 149 in the cleaning circuit 120 is passed, the cleaning circuit 120 finishes the movement completely.

On the other hand, the freezing circuit 121 waits until the output of the OR circuit 137 becomes "L" after the lapse of delay time of the above-mentioned integral circuit 149 and this output is reversed by the inverter 131 and "H" is input to the and circuit 132. And then the freezing circuit 121 starts the freezing movements as described above in detail.

In view of the above, it is desirable that a user is able to make sure of the finish of the cleaning movement with an LED or a buzzer. After the cleaning movement is over, the pipe connecting condition for cleaning shown in FIGS. 17 and 18 which was made before the chilling operation was started on the pervious day is returned to the normal pipe connecting condition shown in FIGS. 4 and 5. First of all, the connection pipe 112 is disconnected from the hot water supply pipe 22A, the transparent pipes 14A1, 14B1, 14C1 and 14D1 are disconnected from the connector 23 and then the transparent pipes 14A1 through 14D1 are connected to the syrup supply pipes 14A, 14B, 14C and 14D again. Furthermore, the plain bearing 95 which had been stored is fitted. The impeller 94 is inserted into the mixing chamber 93 and put in its position. Then the rotation shaft 96 is connected to the cable 98.

With the above operation, now it is possible to take out ice-cream shake again. It is desirable that a user is able to make sure with an LED or a buzzer that temperature of liquid mix in the freezing chamber 5 has lowered from chilling temperature to ideal taking out temperature.

This invention can be composed so that liquid mix in the freezing chamber 5 is freezed by the front freezing system only with the front evaporation pipe 31 wound round approximately overall width of the freezing chamber 5, deleting the rear freezing system and the rear freezing circuit. In this case, one freezing system is inferior to two freezing systems in the relation between freezing and taking-out, but it is not inferior to two freezing systems in the relation between freezing and chilling and it has the same effect as two freezing systems.

As a means to supply liquid mix, it is possible to use compressed gas used for supplying syrup instead of a pumping equipment. It is also possible to arrange a liquid mix tank over the freezing chamber so that liquid mix falls into the freezing chamber naturally. Furthermore, the hot-water supply device can be a hot-water storing type instead of an instantaneous hot-water heater. In addition, it is needless to say that concrete numerical values of temperature, time, voltage, etc. mentioned as the embodiment are not limited to them but can be decided properly according to various conditions. It is also possible to change the design of various parts, devices and equipment used in the embodiment or use other parts, devices and equipment as far as they have the same functions.

For the apparatus for preparing frozen products of this invention described above, explanation has been given on an ice-cream shake manufacturing machine as an example. However, this invention applies to a preparing device of a similar product, for example, soft ice cream as far as it does not deviate from the spirit of this invention. In this case, in stead of ideal ice-cream shake taking out temperature in the embodiment ranging from $-2.5°$ C. to $-3.5°$ C., it is desirable that ideal soft ice cream taking out temperature should be lowered by several degrees and that it should range from $-5°$ C. to $-10°$ C. It is also desirable that the range of ideal chilling temperature should be higher than $0°$ C. and lower than $10°$ C. prescribed by the food sanitary laws.

Another embodiment will be explained with reference to drawings. In case that the elements of the embodiment which will be described here are the same as those of the above-mentioned embodiment, the same numbers used there will be used.

Figure 19:
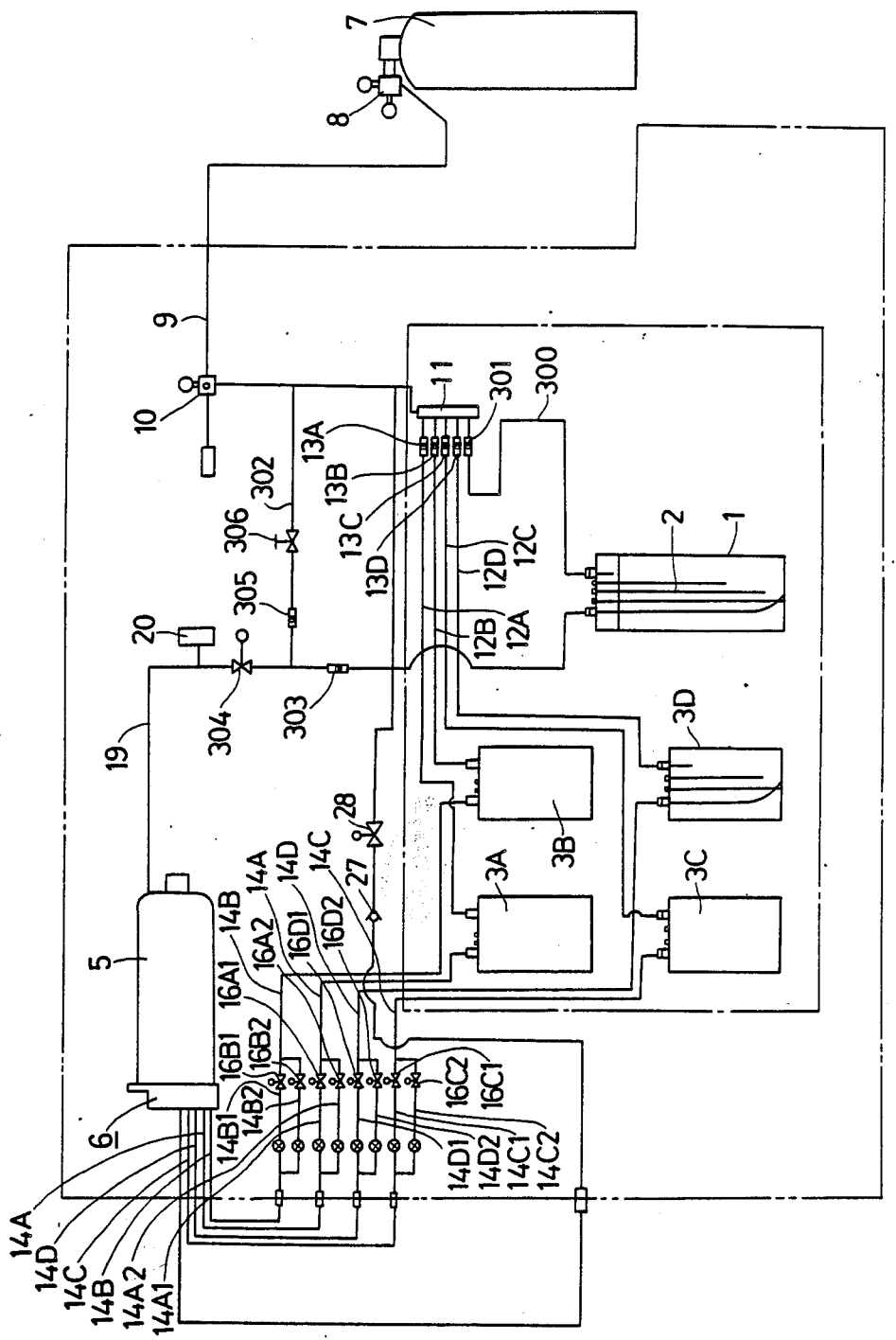
FIG. 19 is a system diagram of another embodiment of this invention which corresponds to FIG. 1.

In the embodiment shown in FIG. 19, the gas cylinder 7 which is a syrup supply means also serves as a supply means of liquid mix in the mix tank 1. Namely, a mix pressure pipe 300 extending from the branch joint 11 is connected to the mix tank 1 through a check valve 301. The mix supply pipe 19 is connected to the rear of the freezing chamber 5 as described in the above-mentioned embodiment.

302 is an overrunning controlling.piep whose one end is connected to the pneumatic pipe 9 at the downstream of the secondary pressure regulator 10 and whose other end is connected to the mix supply pipe 19 between a check valve 303 and a solenoid valve 304, thus bypassing the mix tank 1. A check valve 305 and a manual needle valve 306 which variably controls overrunning by variably adjusting the mixing ratio of nitrogen gas in liquid mix are connected to said controlling pipe 302.

Now the liquid mix supplying movement will be explained. A mix supply solenoid valve 304 is opened by turning on the power. With this, pressure of nitrogen gas adjusted to approximately 6 kg/cm$^2$ with the primary regulator 8 and further adjusted to approximately 3.5 kg/cm$^2$ with the secondary regulator 10 is applied to the mix tank 1 through the pneumatic pipe 9 and the mix pressure pipe 300. Therefore, liquid mix is supplied to the freezing chamber 5 by this pressure from the inlet at the rear of the freezing chamber 5 through the mix supply pipe 19.

Figure 20:
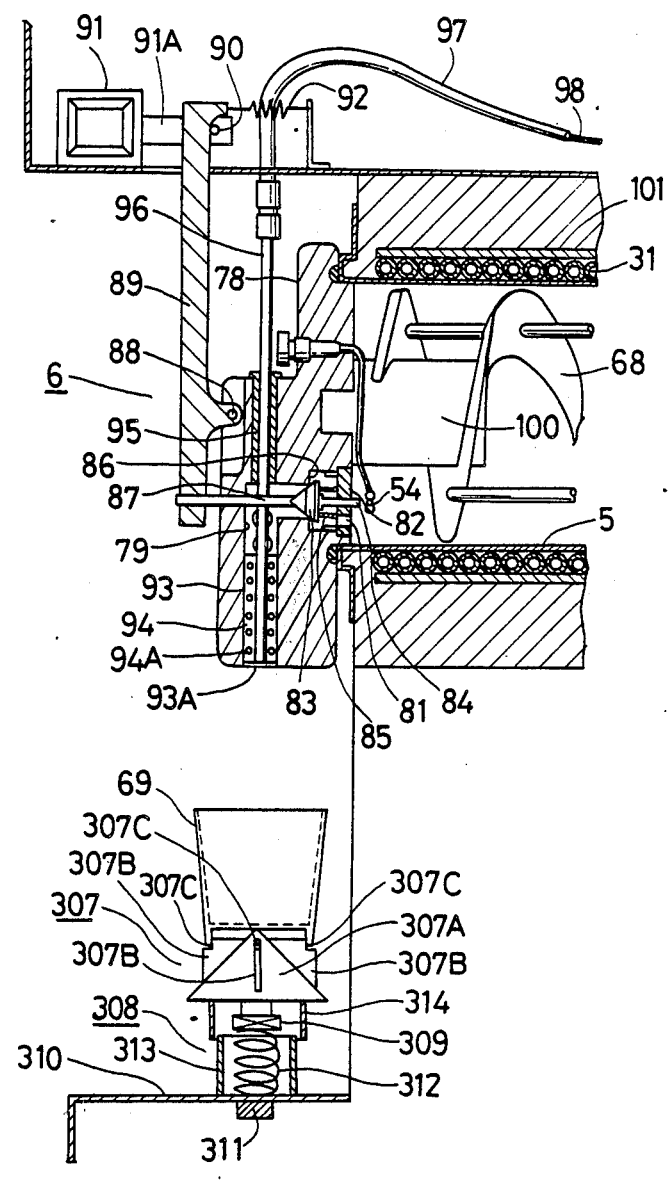
FIG. 20 is a drawing of one more embodiment of this invention which corresponds to FIG. 16.

The apparatus shown in FIG. 19 is equipped with an dispensing amount detecting mechanism to detect the amount of frozen products dispensed by the dispensing device as shown in FIG. 20.

Namely, a supporter 307 on which the cup 69 is put at the lower opposite position of the outlet 93A os the mixing chamber 93 is composed of a truncated base 307A and four supporting plates 307B arranged at intervals of 90 degrees in the vertical direction on the outer surface of said supporting plates 307B. A fitting step part which fits the bottom of the cup 69 is formed in the corner of the supporting plate 307B to support the cup 69 steadily. And a weight detecting device 308 which is an dispensing amount detecting means is composed in combination with this supporter 307. Said device 308 includes a magnet 309 fixed at the bottom of said base 307A, a hall device 311 fitted to the rear of a base 310 and a coiled spring 312 which is situated between the magnet 309 and the base 310 and holds the magnet 309 at a fixed position remoted from the hall device 311. Furthermore, said device 308 is provided with a cylindrical lower guide 313 protruding upward from the base 310 to let said supporter 307 fall with minimum rolling when load is applied to the supporter 307 and a cylindrical upper guide 314 protruding downward from the bottom of the base 307A and having a little larger diameter than the cylindrical lower guide 313.

As the supporter 307 falls owing to weight of ice-cream shake dispensed to the cup 69, the magnet 309 approaches the hall device 311. Thus with the output voltage of the hall device 311 which responds to the change in magnetic force between the magnet 309 and the hall device 311, the weight detecting device 308 controls the above-mentioned syrup solenoid valves 16A1, 16A2, 16B1, 16B2, 16C1, 16C2, 16D1 and 16D2 and the solenoid 91. Especially when the supporter 307 falls to a fixed position, said weight detecting device 308 controls them not to move and automatically stops the dispensing movement. The above-mentioned syrup solenoid valves and the solenoid 91 forms the dispensing amount controlling means. In more detail, in case that syrup in the syrup tank 3A is fed to the dispensing device 6 for example, a syrup solenoid valve 16A1 is opened by a dispensing signal and is closed when the supporter 307 falls to the second position after passing through the first position. When output voltage of the hall device 311 at the time of the supporter 307 falling from the stop position to the first position is set up within preset standard time, another syrup solenoid valve 16A2 is opened while the supporter 307 falls from the first position to the second position. This is because the amount of syrup becomes short if the supporter 307 falls to the first position earlier. Such movement of the syrup solenoid valve 16A1 and 16A2 is effective in keeping the amount of syrup in shake constant.

The appartus for preparing frozen products with this invention has two freezing systems. Therefore, liquid mix supplied to the freezing chamber can be finished to semi-frozen products of almost uniform hardness in the whole area of the freezing chamber. Especially when new liquid mix is replenished to the rear part of the freezing chamber with dispensation of frozen products, irrespective of intermittent or continuous dispensation, semi-frozen products can be finished to ideal hardness in a short time. At the same time, semi-frozen products in the front area of the freezing chamber can also be maintained in the ideal condition. The apparatus with this invention has extremely excellent advantages as mentioned above.

Furthermore, the apparatus for preparing frozen products with this invention is equipped with the cleaning mechanism for the dispensing device, the sterilizing mechanism for the freezing chamber and the dispensing amount controlling mechanism for frozen products. For this reason, the apparatus has practical advantages such as cleanliness and convenient use.

In addition, this invention is provided with the chilled control means to maintain liquid mix in the low temperature liquid condition at night, for example, when frozen products such as ice-cream shake and soft ice cream are not taken out at all for a long time. This eliminates the conventional collecting work of liquid mix in the freezing chamber to be made almost every day and troublesome cleaning and sterilizing work which must follow the collecting work.

Also, eliminated by this invention is inconvenience caused when frozen products are not taken out for a long time, for example, when they are controlled at temperature which suits taking-out, namely, a fault that ice particles in liquid mix grow excessively and deteriorate the value of product considerably. Liquid mix in the freezing chamber is chilled uniformly in the liquid condition. Furthermore, this invention is effective in restraining the breeding of various germs by chilling liquid mix at a little higher temperature than 0° C.

Another advantage of this invention is that this apparatus is effective in labor saving because the working ratio of the chilling operation based on the chilled control means is lower than the freezing operation based on the frozen control means.

What we claim is:

1. An apparatus for preparing frozen products comprising:

a mix tank to store liquid mix, a freezing chamber having an inlet of liquid mix and providing an agitator to agitate liquid mix, A liquid mix supply means to supply liquid mix in the mix tank to the freezing chamber through the inlet, a dispensing device for dispensing frozen products in the freezing chamber, freezing means to effect a freezing temperature in the freezing chamber, the freezing means including a first freezing system to effect a freezing temperature in an area of the freezing chamber including the neighborhood of the dispensing device and a second freezing system to freeze an area of the freezing chamber including the neighborhood of the inlet of liquid mix, the first freezing system including a closed refrigerant circuit having a compressor, a condenser, a pressure reducer and an evaporator which is heat-exchanged with the area of the freezing chamber including the neighborhood of the dispensing device, and the second freezing system including a closed refrigerant circuit having a compressor, a condenser, a pressure reducer and an evaporator which is heat-exchanged with the area of the freezing chamber including the neighborhood of the inlet of liquid mix, frozen control means to control the operation of the freezing means, the frozen control means comprising a first frozen control means and a second frozen control means, the first frozen control means including a first temperature detector to detect the temperature at a preselected portion in the freezing chamber including the neighborhood of the dispensing device, the first frozen control means controlling the operation of the first freezing system independently when the detected temperature of the first temperature detector is raised to a preset temperature, and the second frozen control means including a second temperature detector to detect the temperature at a preselected portion in the freezing chamber including the neighborhood of the inlet of liquid mix, the second frozen control means controlling the operation of the first freezing system independently when the detected temperature of the second temperature detector is raised to a preset temperature of the second frozen control means which is preset higher than a preset temperature of the first frozen control means.

2. An apparatus as claimed in claim 1, wherein the preset temperature of the first frozen control means if approximately −3.0° C. and the preset temperature of the second frozen control means is approximately −1.4° C.

3. An apparatus as claimed in claim 1, wherein the freezing chamber is cylindrical and is arranged so that its axis is aligned with the front to rear direction of the whole apparatus, and wherein the inlet of liquid mix is situated at the rear part of the freezing chamber, and the dispensing device is situated at the front part of the freezing chamber.

4. An apparatus as defined by claim 1, which further comprises a cleaning mechanism, the cleaning mechanism including a cleaning means for the dispensing device, and a cleaning control means to control the operation of the cleaning means.

5. An apparatus as claimed in claim 4, wherein the cleaning means includes a hot water supply device and a hot water supply pipe which goes from the hot water supply device to the dispensing device.

6. An apparatus as defined by claim 1, which further comprises a sterilizing mechanism, the sterilizing mechanism including a sterilizing means for the freezing chamber and a sterilization control means to control the operation of the sterilizating means.

7. An apparatus as claimed in claim 6, wherein the sterilizating means is a heating mechanism to heat the freezing chamber.

8. An apparatus as claimed in claim 7, wherein the heating mechanism includes an electric heater, a pipe for heating and a means to feed heating media to said pipe for heating.

9. An apparatus as defined by claim 1, which further comprises a dispensing amount controlling mechanism, the dispensing amount controlling mechanism including a dispensing amount detecting means to detect the amount of frozen products dispensed by the dispensing device, and a dispensing amount control means to control the stop of dispensation of frozen products in response to a signal from the dispensing amount detecting means.

10. An apparatus as claimed in claim 9, wherein the dispensing amount detecting means is a weight detecting device.

11. An apparatus as defined by claim 1, which further comprises plural syrup tanks to store plural kinds of syrup separately and a syrup supply means to supply syrup in the syrup tank to the dispensing device.

12. An apparatus as claimed in claim 11, wherein the mix supply means includes a mix supply pipe and a mix supply working body, wherein the syrup supply means includes a syrup supply pipe and a syrup supply working body, and wherein both working bodies are used in a combined manner by a compressed gas supply source.

13. An apparatus for preparing frozen products comprising:

a mix tank to store liquid mix, a freezing chamber having an inlet of liquid mix and providing an agitator to agitate liquid mix, a liquid mix supply means to supply liquid mix in the mix tank to the freezing chamber through the inlet, a dispensing device for dispensing frozen products in the freezing chamber, freezing means to effect a freezing temperature in the freezing chamber, a frozen control means to control the operation of the freezing means so as to keep liquid mix in the freezing chamber in a semi-frozen condition, a chilled control means to control the operation of the freezing means so as to keep liquid mix in the freezing chamber in the low-temperature liquid condition, a switching means to switch either the frozen control means or the chilled control means, and a sterilizing mechanism including a sterilizing means for the freezing chamber and a sterilization control means to control the operation of the sterilizing mean; wherein, the sterilization is automatically effected by the sterilizing mechanism prior to chilling, when the freezing means is switched to operate with the chilled control means by the switching means.

14. An apparatus as claimed in claim 13, wherein the freezing means includes a first freezing system to effect a freezing temperature in an area of the freezing chamber including the neighborhood of the dispensing device, and a second freezing system to effect a freezing temperature in neighborhood of the inlet of liquid mix.

15. An apparatus as claimed in claim 14, wherein the frozen control means controls the operation of the first and second freezing systems, and the chilled control means controls the operation of the first freezing system.

16. An apparatus as claimed in claim 13, wherein a preset temperature of the chilled control means is a little higher than 0° C.

17. An apparatus as claimed in claim 13, wherein the switching means includes a freezing switch and a chilling switch.

18. An apparatus as claimed in claim 13, which further includes a power switch, and wherein operation of the freezing means by the frozen control means is started by turning on the power switch.

19. An apparatus as claimed in claim 18, wherein cleaning by a cleaning mechanism is made only prior to freezing when the frozen control means is switched to operate the freezing means.

20. An apparatus as claimed in claim 13, wherein the sterilizing means has a heating mechanism to heat the freezing chamber.

21. An apparatus as claimed in claim 20, wherein the heating mechanism includes an electric heater, a pipe for heating and means to feed heating media to said pipe for heating.

22. An apparatus as defined by claim 13, which further comprises a cleaning mechanism having a cleaning means for the dispensing device, and a cleaning control means to control the operation of the cleaning means.

23. An apparatus as defined by claim 22, wherein when the freezing means is switched to operate with the frozen control means by the switching means, cleaning is made by a cleaning mechanism prior to freezing.

24. An apparatus as claimed in claim 22, wherein cleaning by the cleaning mechanism is made together with sterilization by the sterilizing mechanism prior to chilling.

25. An apparatus as claimed in claim 22, wherein the cleaning means includes a hot water supply device and a hot water supply pipe which goes from the hot water supply device to the dispensing device.

* * * * *